United States Patent
Khan et al.

(10) Patent No.: US 9,763,027 B2
(45) Date of Patent: Sep. 12, 2017

(54) METHOD AND APPARATUS FOR COMMUNICATION USING IP ADDRESS EXCHANGED VIA NFC

(71) Applicant: Samsung Electronics Co., Ltd., Suwon-si, Gyeonggi-do (KR)

(72) Inventors: Ashmath Khan, Suwon-si (KR); Kwang-Yong Lee, Yongin-si (KR); Hyun-Su Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 14/444,235

(22) Filed: Jul. 28, 2014

(65) Prior Publication Data

US 2015/0032792 A1    Jan. 29, 2015

(30) Foreign Application Priority Data

Jul. 26, 2013  (KR) .................. 10-2013-0089076

(51) Int. Cl.

| | | |
|---|---|---|
| G06F 15/16 | (2006.01) | |
| G06F 15/173 | (2006.01) | |
| H04W 4/00 | (2009.01) | |
| H04L 12/58 | (2006.01) | |
| H04L 12/28 | (2006.01) | |
| H04L 29/08 | (2006.01) | |

(52) U.S. Cl.
CPC ............ *H04W 4/008* (2013.01); *H04L 51/04* (2013.01); *H04L 51/046* (2013.01); *H04L 67/141* (2013.01); *H04L 67/06* (2013.01)

(58) Field of Classification Search
USPC .................. 709/201, 228, 222, 227, 217
See application file for complete search history.

(56) References Cited

U.S. PATENT DOCUMENTS

| | | | | |
|---|---|---|---|---|
| 7,684,803 | B2 * | 3/2010 | Gallagher | H04W 60/04 370/331 |
| 7,965,701 | B1 * | 6/2011 | Toennis | H04L 63/0428 370/352 |
| 8,363,086 | B1 | 1/2013 | Shah | |
| 8,631,087 | B2 * | 1/2014 | Ise | H04L 29/06027 370/399 |
| 8,676,957 | B2 * | 3/2014 | Motoyama | H04L 43/067 709/208 |
| 8,713,669 | B2 * | 4/2014 | Guichard | H04L 63/0272 380/277 |
| 8,767,689 | B2 * | 7/2014 | Zabawskyj | H04L 12/66 370/338 |

(Continued)

FOREIGN PATENT DOCUMENTS

WO    2012/135026 A1    10/2012

*Primary Examiner* — Jude Jean Gilles
(74) *Attorney, Agent, or Firm* — Jefferson IP Law, LLP

(57) ABSTRACT

A method of performing communication with a second communication device by a first communication device is provided. The method includes identifying an Internet Protocol (IP) address for communication with a first communication network, providing data including the IP address to the second communication device connected through a second communication network, and executing a communication application being connected with the second communication device via the first communication network using the IP address.

24 Claims, 14 Drawing Sheets

(56) References Cited

U.S. PATENT DOCUMENTS

| | | | |
|---|---|---|---|
| 9,143,480 B2* | 9/2015 | Brousseau | H04L 63/0272 |
| 2001/0048682 A1* | 12/2001 | Fichou | H04L 12/4604 |
| | | | 370/392 |
| 2004/0246950 A1* | 12/2004 | Parker | H04L 29/12018 |
| | | | 370/356 |
| 2005/0074008 A1* | 4/2005 | Herledan | H04L 12/5692 |
| | | | 370/392 |
| 2006/0089893 A1* | 4/2006 | Joseph | G06Q 20/1085 |
| | | | 705/35 |
| 2006/0223536 A1 | 10/2006 | Chia | |
| 2007/0001853 A1 | 1/2007 | Otranen | |
| 2008/0043760 A1* | 2/2008 | Venkatraman | H04L 12/4641 |
| | | | 370/401 |
| 2008/0130523 A1* | 6/2008 | Fridman | H04W 8/28 |
| | | | 370/259 |
| 2009/0051498 A1 | 2/2009 | Otranen | |
| 2009/0170483 A1 | 7/2009 | Barnett et al. | |
| 2011/0138057 A1 | 6/2011 | Frank et al. | |
| 2011/0275316 A1 | 11/2011 | Suumäki et al. | |
| 2012/0224567 A1* | 9/2012 | Chen | H04M 1/2535 |
| | | | 370/338 |
| 2013/0070745 A1* | 3/2013 | Nixon | H04L 45/74 |
| | | | 370/338 |

* cited by examiner

| DATA IDENTIFIER | DATA | DATA LENGTH |
|---|---|---|
| "IP6" | IPV6 GLOBAL ADDRESS | 16 BYTES |
| "IP4" | IPV4 PUBLIC ADDRESS | 4 BYTES |
| "TCP" | TCP PORT | 2 BYTES |
| "UDP" | UDP PORT | 2 BYTES |
| "WAY" | TRANSFER TYPE<br>1 = FILE TRANSFER<br>2 = INSTANT MESSAGING<br>3 = CAMERA PICTURES<br>4 = VOIP CALL | 1 BYTES |
| "URL" | 2 BYTES LENGTH FOLLOWED BY FILE PATH WITH FILE NAME | 2 BYTES + FILE PATH + FILE PATH + |

| OCTET | |
|---|---|
| 0 | NUMBER OF ELEMENT |
| 1 | ELEMENT TYPE |
| 2 | ELEMENT LENGTH(L1) |
| 3 | ELEMENT VALUE |
| ... | ... |
| 2+L1 | END OF ELEMENT VALUE |
| ... | ... |
| N | ELEMENT TYPE |
| N+1 | ELEMENT LENGTH(LN) |
| N+2 | ELEMENT VALUE |
| ... | ... |
| N+1+LN | END OF ELEMENT VALUE |

550 — ELEMENT TYPE
551 — ELEMENT LENGTH(L1)
552 — ELEMENT VALUE

| ELEMENT TYPE | DESCRIPTION | LENGTH | VALUE |
|---|---|---|---|
| 0 | MESSAGE SHARE IDENTIFIER ELEMENT (MSIE) USING THIS ELEMENT THE SENDER OF THIS MESSAGE INFORMS THE RECEIVER THAT THIS IS THE PHONE NUMBER OF THE PARTY WHICH IS JOINING THE CONVERSATION | GIVES THE LENGTH OF THE ELEMENT | VALUE GIVES THE IDENTIFIER OF THE USER WHICH IS USUALLY THE PHONE NUMBER |
| 1 | MESSAGE UNSHARE IDENTIFIER ELEMENT (MUIE) USING THIS ELEMENT THE SENDER OF THIS MESSAGE INFORMS THE RECEIVER THAT THIS IS THE PHONE NUMBER OF THE PARTY WHICH IS LEAVING THE CONVERSATION | GIVES THE LENGTH OF THE ELEMENT | VALUE GIVES THE IDENTIFIER OF THE USER WHICH IS USUALLY THE PHONE NUMBER |
| 2 | MESSAGE SENT BY USER | GIVES THE LENGTH OF THE ELEMENT | VALUE GIVES THE MESSAGE SENT BY USER |

FIG.5C

| ELEMENT TYPE | DESCRIPTION | LENGTH | VALUE |
|---|---|---|---|
| 0 | THIS GIVES THE PATH AND FILE NAME OF THE CAMERA PICTURES TAKEN EACH ELEMENT REPRESENTS ONE FILE EXAMPLE: USER/CAMERA/1.JPG | GIVES THE LENGTH OF THE ELEMENT | VALUE GIVES FILE PATH AND FILE NAME |

| OCTET | |
|---|---|
| 0 | NUMBER OF ELEMENT |
| 1 | ELEMENT TYPE — 650 |
| 2 | ELEMENT LENGTH(L1) — 651 |
| 3 | ELEMENT VALUE — 652 |
| ... | ... |
| 2+L1 | END OF ELEMENT VALUE |
| ... | ... |
| N | ELEMENT TYPE |
| N+1 | ELEMENT LENGTH(LN) |
| N+2 | ELEMENT VALUE |
| ... | ... |
| N+1+LN | END OF ELEMENT VALUE |

FIG.6C

| OCTET | |
|---|---|
| 0 | NUMBER OF ELEMENT |
| 1 | ELEMENT TYPE |
| 2 | ELEMENT LENGTH(L1) |
| 3 | ELEMENT VALUE |
| ... | ... |
| 2+L1 | END OF ELEMENT VALUE |
| ... | ... |
| N | ELEMENT TYPE |
| N+1 | ELEMENT LENGTH(LN) |
| N+2 | ELEMENT VALUE |
| ... | ... |
| N+1+LN | END OF ELEMENT VALUE |

750 → ELEMENT TYPE
751 → ELEMENT LENGTH(L1)
752 → ELEMENT VALUE

| ELEMENT TYPE | DESCRIPTION | LENGTH | VALUE |
|---|---|---|---|
| 0 | CALL SHARE IDENTIFIER ELEMENT(CSIE) USING THIS ELEMENT THE SENDER OF THIS MESSAGE INFORMS THE RECEIVER THAT THIS IS THE PHONE NUMBER OF THE PARTY WHICH IS CONNECTING THE CALL | GIVES THE LENGTH OF THE ELEMENT | VALUE GIVES THE IDENTIFIER OF THE USER WHICH IS USUALLY THE PHONE NUMBER |
| 1 | CALL UNSHARE IDENTIFIER ELEMENT (CUIE) USING THIS ELEMENT THE SENDER OF THIS MESSAGE INFORMS THE RECEIVER THAT THIS IS THE PHONE NUMBER OF THE PARTY WHICH IS ENDING THE CALL | GIVES THE LENGTH OF THE ELEMENT | VALUE GIVES THE IDENTIFIER OF THE USER WHICH IS USUALLY THE PHONE NUMBER |

FIG. 7C

METHOD AND APPARATUS FOR COMMUNICATION USING IP ADDRESS EXCHANGED VIA NFC

CROSS-REFERENCE TO RELATED APPLICATION(S)

This application claims the benefit under 35 U.S.C. §119(a) of a Korean patent application filed on Jul. 26, 2013 in the Korean Intellectual Property Office and assigned Serial number 10-2013-0089076, the entire disclosure of which is hereby incorporated by reference.

TECHNICAL FIELD

The present disclosure relates to a communication method. More particularly, the present disclosure relates to a method and an apparatus for applying a Near Field Communication (NFC) scheme to a mobile communication method.

BACKGROUND

Recently, various services and additional functions provided by mobile devices are gradually increasing. In order to enhance an effective value of such mobile devices and satisfy various needs of users, various applications executable in mobile devices are being developed.

A mobile device may store and execute basic applications, which are manufactured and installed in the mobile device by a manufacturer of the mobile device, and additional applications, which are downloaded through the Internet from application selling Web sites. The additional applications may be developed by general developers and may be registered in the application selling Web sites. Further, anyone who has developed an application can freely sell the developed application to a user of a mobile device through the application selling Web sites. Therefore, tens of thousands to hundreds of thousands of applications are being provided to mobile devices either free of charge and/or with charges.

Accordingly, tens of thousands to hundreds of thousands of applications may be stored in a mobile device, such as a smart phone or a tablet Personal Computer (PC), and shortcut keys for executing those applications are displayed in a form of icons on a touch screen of the mobile device. By touching one of the icons displayed on the touch screen, the user can execute a desired application in the mobile device.

Further, the mobile device as described above includes a mobile communication module for performing a mobile communication, such as a cellular communication or a Wi-Fi communication, and also a Near Field Communication (NFC) module which enables a communication within a relatively short distance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for communication, which transmit and receive Internet Protocol (IP) address information used in a mobile communication module, by using a communication scheme, such as a Near Field Communication (NFC) scheme, which enables a communication within a relatively short distance.

In accordance with an aspect of the present disclosure, a method of performing communication with a second communication device by a first communication device is provided. The method includes identifying an IP address for communication with a first communication network, providing data including the IP address to the second communication device connected through a second communication network, and executing a communication application being connected with the second communication device via the first communication network using the IP address.

In accordance with another aspect of the present disclosure, a terminal apparatus is provided. The terminal apparatus includes a first communication unit configured to use an IP address, to connect to a first communication network, and to transmit and receive a communication signal according to a first communication scheme, a second communication unit configured to provide a first communication device with a communication signal according to a second communication scheme through a second communication network, a memory configured to store at least a communication processing program, and a controller configured to control at least the communication processing program, wherein the communication processing program includes commands for: identifying the IP address by the first communication unit, providing data including the IP address to a second communication device by the second communication unit, and executing a communication application being connected with the second communication device via the first communication network using the IP address.

In accordance with another aspect of the present disclosure, a method of performing communication by a second communication device connected with a first communication device is provided. The method includes identifying an Internet Protocol (IP) address of a second communication device for communication with a first communication network, receiving data, including an IP address of the first communication device, from the first communication device connected through a second communication network, and executing a communication application being connected with the second communication device via the first communication network using the IP address.

In accordance with another aspect of the present disclosure, a second communication device communicating with a first communication device is provided. The second communication device includes a first communication unit configured to use an Internet Protocol (IP) address of a second communication device, to connect to a first communication network, and to transmit and receive a communication signal according to a first communication scheme, a second communication unit configured to receive a communication signal according to a second communication scheme from a first communication device through a second communication network, a memory configured to store at least a communication processing program, and a controller configured to control at least the communication processing program, wherein the communication processing program includes commands for: identifying the IP address of the second communication device by the first communication unit, receiving data, including the IP address of the first communication device, from the first communication device by the second communication unit, and executing a communication application being connected with the second communication device via the first communication network using the IP address.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5C illustrates an example of a data message format used in a communication method according to the second embodiment of the present disclosure;

FIG. 6C illustrates an example of a data message format used in a communication method according to the third embodiment of the present disclosure;

FIG. 7C illustrates an example of a data message format used in a communication method according to the fourth embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terminologies including ordinals such as first and second may be used in describing various elements, those elements are not limited by the terminologies. The terminologies are merely used for the purpose of differentiating one element from another element. For example, a first element may be referred to as a second element and vice versa without departing from the scope of the present disclosure. The terminologies used herein are not intended to limit the present disclosure but to describe specific various embodiments. A singular expression may include a plural expression unless it clearly expresses different meaning in context.

Figure 1:
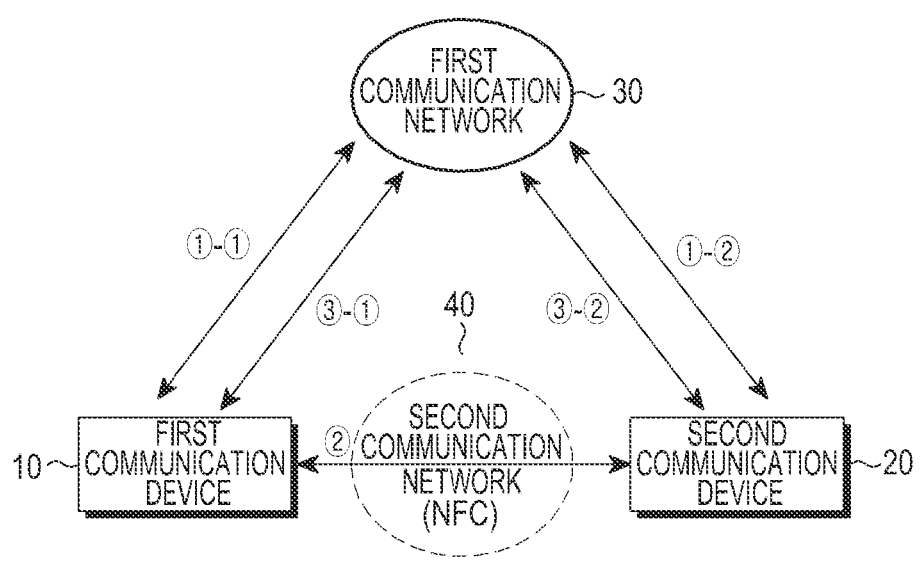
FIG. 1 illustrates a concept of a communication system according to an embodiment of the present disclosure.

FIG. 1 illustrates the concept of a communication system according to an embodiment of the present disclosure.

Referring to FIG. 1, a communication system according to an embodiment of the present disclosure includes a first communication device 10 and a second communication device 20. The first communication device 10 and the second communication device 20 may be connected to a first communication network 30 by a first communication scheme in order to perform a communication using an Internet Protocol (IP) address. Further, the first communication device 10 and the second communication device 20 can exchange data through a second communication scheme enabling communication within a relatively short distance, such as a Near Field Communication (NFC) scheme applied to a second communication network 40.

In the communication system according to an embodiment of the present disclosure, the first communication device 10 is connected to the first communication network 30 through a first communication scheme. In this event, the first communication device 10 identifies a first IP address for connection to the first communication network 30. The first IP address may be determined by either the first communication device 10 or the first communication network 30. In the same way, the second communication device 20 may be also connected to the first communication network 30 through the first communication scheme, and a second IP address is used for the connection to the first communication network 30.

Thereafter, as the first communication device 10 and the second communication device 20 enter and/or are disposed within a distance supported by the second communication scheme, the first communication device 10 and the second communication device 20 transmit and receive data through the second communication scheme. Especially, the first communication device 10 provides address information including the first IP address to the second communication device 20. Further, the first communication device 10 may further provide the second communication device 20 with information of a communication application performed for the communication between the first communication device 10 and the second communication device 20. The information of the communication application may be included and transmitted in the address information.

Next, the first communication device 10 and the second communication device 20 are connected to the first communication network 30, and the communication application is processed using the first IP address provided to the second communication device 20 in the above procedure.

Figure 2:
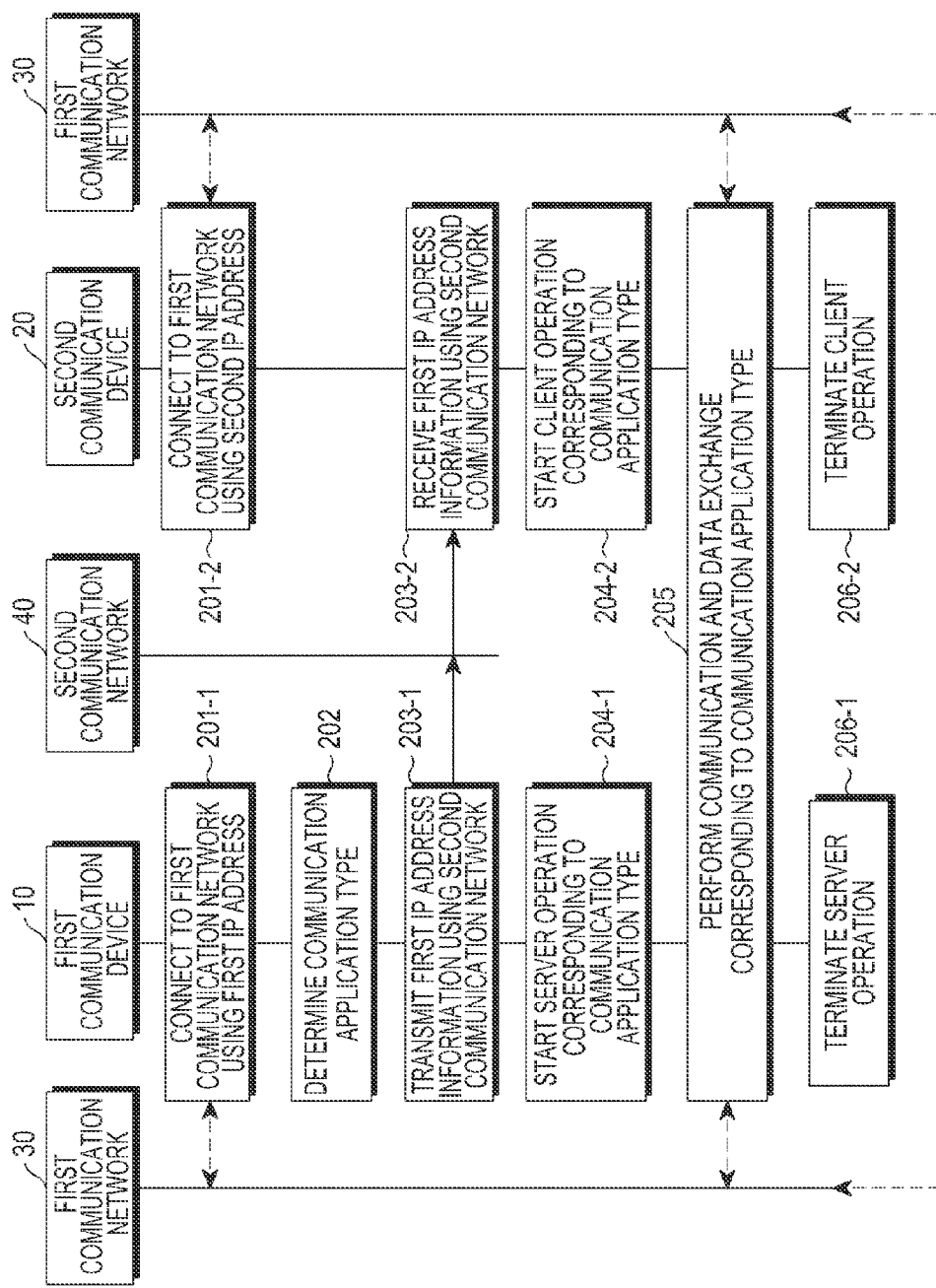
FIG. 2 is a signal flow diagram illustrating a process of a communication method according to a first embodiment of the present disclosure.

FIG. 2 is a signal flow diagram illustrating the process of a communication method according to a first embodiment of the present disclosure.

Referring to FIG. 2, a communication method according to the first embodiment of the present disclosure includes operation 201-1 in which the first communication device 10 connects to the first communication network 30 through the first communication scheme by using the first IP address; and operation 201-2 in which the second communication device 20 connects to the first communication network 30 through the first communication scheme by using the second IP address. The first IP address may be either allocated by the first communication device 10 and provided to the first communication network 30 or allocated by the first communication network 30 and provided to the first communication device 10.

The first communication network 30 may be a mobile communication network, such as a cellular-based communication network or a Wi-Fi network-based communication network. The first communication network 30 should be a network in which the first communication device 10 and the second communication device 20 can maintain a stable connection without an influence by the environment, and it goes without saying that the first communication network 30 may be changed in various ways in consideration of such a condition.

Further, each of the first IP address and the second IP address may be an IP address based on IP version 6 (IPv6). As another example, each of the first IP address and the second IP address may be an IP address based on IP version 4 (IPv4) and, particularly, may include a public IPv4 address.

Next, the first communication device 10 transmits the first IP address information to the second communication device 20 through a second communication network 40, and the second communication device 20 may accordingly receive the first IP address information through the second communication network 40. The second communication network 40 may be an NFC network. Therefore, the first IP address information may be transmitted using a data transmission/reception message format defined in the NFC network. For example, a data transmission/reception message may have a format as shown in FIG. 3A.

Figures 3A, 3B:
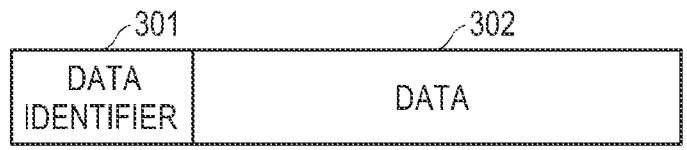
FIG. 3A illustrates an example of a data message structure used in a communication method according to an embodiment of the present disclosure.
FIG. 3B illustrates an example of a data message format used in a communication method according to an embodiment of the present disclosure.

FIG. 3A illustrates an example of a data message structure used in a communication method according to an embodiment of the present disclosure.

Referring to FIG. 3A, a data transmission/reception message 300 includes a data identifier field 301 for identifying the type of transmitted data and a data field 302 including the transmitted data. Therefore, the data identifier field 301 may include an identifier indicating IP address information and the data field 302 may include the first IP address. Further, as described above, the first IP address may include an IP address based on IPv6 or IPv4. Therefore, the data identifier field 301 may include a value indicating whether the first IP address included in the data field 302 is a value based on IPv6 or a value based on IPv4.

FIG. 3B illustrates an example of a data message format used in a communication method according to an embodiment of the present disclosure.

Referring to FIG. 3B, the data identifier field 301 may include "IPv6" as an identifier indicating that the first IP address is a value based on IPv6 and the data field 302 may include an IPv6 address as the first IP address. Or, the data identifier field 301 may include "IPv4" as an identifier indicating that the first IP address is a value based on IPv4 and the data field 302 may include an public IPv4 address as the first IP address.

Moreover, the first communication device 10 may further need port information according to a communication application to be performed. Therefore, the first communication device 10 may further transmit port information to be used by a communication application, as well as the first IP address information, through the second communication network 40, wherein the port information may be transmitted or received using the data transmission/reception message 300 described above. For example, when the communication application uses Transmission Control Protocol (TCP), the first communication device 10 may further transmit the data transmission/reception message 300 including TCP port information in operation 203-1. That is, the first communication device 10 may configure the data transmission/reception message 300 by including an indicator (e.g. TCP), which indicates that it is port information, in the data identifier field 301 and a TCP port address in the data field 302, and then transmit the configured data transmission/reception message 300 to the second communication device 20 through the second communication network 40 such that the second communication device receives the data transmission/reception message 300 in operation 203-2. Otherwise, when the communication application uses User Datagram Protocol (UDP), the first communication device 10 may further transmit a data transmission/reception message 300 including UDP port information in operation 203-1. That is, the first communication device 10 may configure the data transmission/reception message 300 by including an indicator, e.g. UDP, which indicates that it is port information, in the data identifier field 301 and a UDP port address in the data field 302, and then transmit the configured data transmission/reception message 300 to the second communication device 20 through the second communication network 40.

Moreover, in order to perform a communication application with the second communication device 20, the first communication device 10 determines a type of a communication application in operation 202. Then, the first communication device 10 may transmit information on the type of the communication application to the second communication device 20 through the second communication network 40. That is, in operation 203-1, the first communication device 10 may configure a data transmission/reception message 300 by including an indicator, e.g. Way, indicating that it is an identifier of a communication application in the data identifier field 301 and a type of the communication application (see FIG. 3B) in the data field 302, and then transmit the configured data transmission/reception message 300 to the second communication device 20.

Meanwhile, the first communication device 10, having transmitted the first IP address information, may operate as a server and the second communication device 20, having received the first IP address information, may operate as a client in execution of the communication application. Therefore, in operation 204-1, the first communication device 10 sets a parameter value, etc. for an operation as a server by using the first IP address information and then starts to operate as a server. In operation 204-2, the second communication device 20 sets a parameter value, etc. for an operation as a client by using the first IP address information and then starts to operate as a client.

Then, the first communication device 10 and the second communication device 20 respectively perform operations as a server and a client so as toe perform communication and data exchange corresponding to the communication application type in operation 205. The first communication device 10 and the second communication device 20 transmit and receive data needed for execution of the communication application through the first communication network 30 connected using the first IP address information. For example, the second communication device 20 may request a connection with the first communication device 10 by using the first IP address information, and the first communication device 10 may transmit a data file to the second communication device 20, and the second communication device 20 may transmit and/or receive an Instant Message (IM) to and/or from the first communication device 10, and may transmit and/or receive a media file, or transmit and/or receive data needed for Voice over IP (VoIP) communication.

Finally, as the operation of the communication application is completed, the first communication device 10 terminates the operation as the server in operation 206-1 and the second communication device 20 terminates the operation as the client in operation 206-2.

Meanwhile, a communication method according to an embodiment of the present disclosure may be applied to various communication applications using IP address information. Hereinafter, examples of application of a communication method according to an embodiment of the present disclosure to various communication applications are described. However, the present disclosure is not limited to those examples and includes any configuration in which IP address information is provided through a second communication network, for example, an NFC network, to be used in the first communication network. Therefore, it is apparent to one skilled in the art that various modifications and applications can be made, based on the basic configuration as described above, FIG. 4A is a flowchart showing an operation of a first communication device in a communication method according to a first embodiment of the present disclosure, and FIG. 4B is a flowchart showing an operation of a second communication device in a communication method according to a first embodiment of the present disclosure.

The following description of the communication method according to the first embodiment of the present disclosure is based on an example in which it is applied to a data file transmission application for transmitting a data file from the first communication device 10 to the second communication device 20.

Figure 4A:
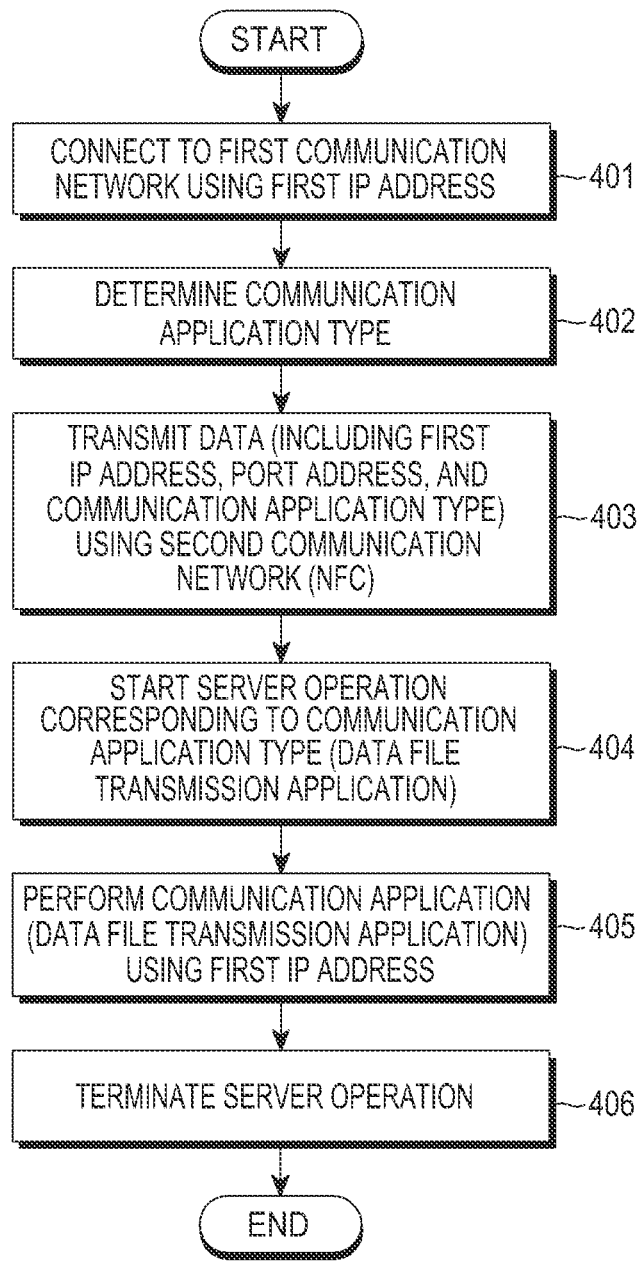
FIG. 4A is a flowchart showing an operation of a first communication device in a communication method according to the first embodiment of the present disclosure.
Figure 4B:
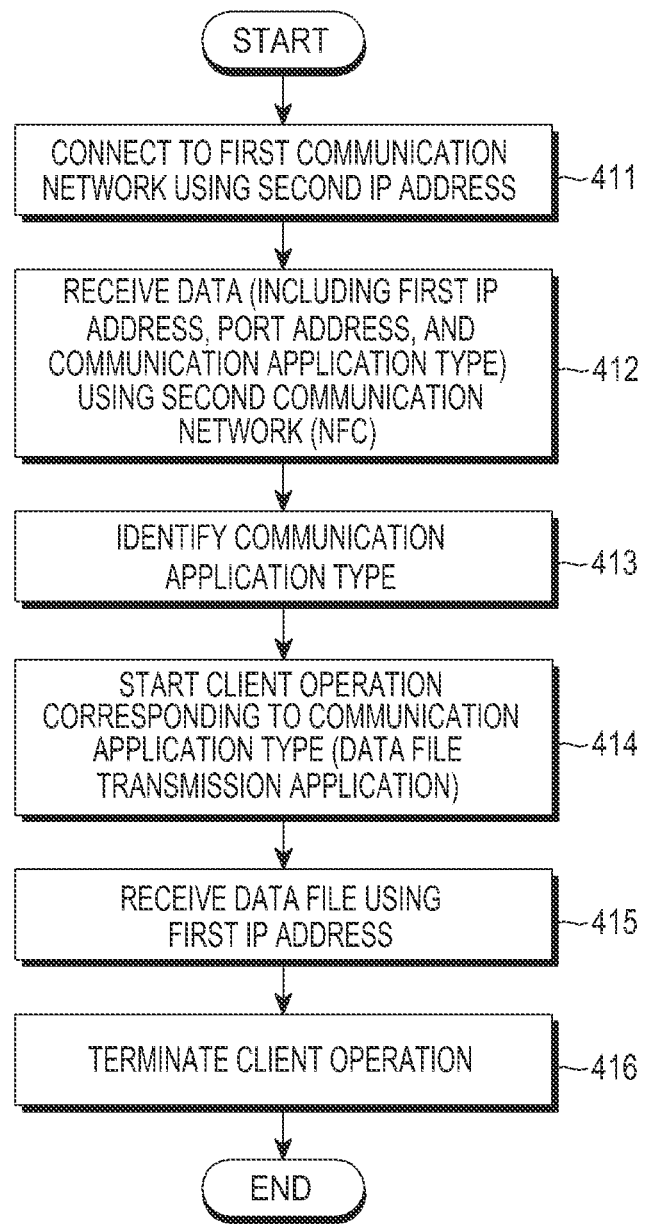
FIG. 4B is a flowchart showing an operation of a second communication device in a communication method according to the first embodiment of the present disclosure.

Referring to FIG. 4A, first, the first communication device 10 connects to the first communication network 30 through a first communication application in operation 401. At the time of connection to the first communication network 30, the first communication device 10 identifies the first IP address allocated to the first communication device 10. The identified first IP address may be an IP address allocated based on the first communication device 10 or an IP address allocated based on the first communication network 30.

The first communication network 30 may be a mobile communication network, e.g. a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition.

Further, the first IP address may be an IP address based on IPv6. As another example, the first IP address may be an IP address based on IPv4 and, particularly, may include a public IPv4 address.

Next, in operation 402, the first communication device 10 determines the type of a communication application. For example, the type of the communication application may be determined according to a user's input of an operation of an application or a menu provided by the first communication device 10. The communication method according to the first embodiment of the present disclosure is based on an example in which it is applied to a data file transmission application, and may be determined as the user selects a data file transmission application among applications or in a menu arranged in the first communication device 10.

Further, in operation 402, as the user selects a data file transmission application, the operation of the data file transmission application may begin. The data file transmission application may further process a procedure of providing a user with a User Interface (UI) or menu, which enables selection of a data file, and receiving a user's input of selection of at least one data file to be transmitted.

In operation 403, the first communication device 10 transmits data, in order to provide the second communication device 20 with predetermined data, using the second communication network 40. The second communication network 40 may be a network which transmits and receives data through an NFC scheme. Therefore, in order to enable the first communication device 10 to provide predetermined data to the second communication device 20, a connection of an NFC network between the first communication device 10 and the second communication device 20 is needed. To this end, the communication method includes operation 403 in which the first communication device 10 and the second communication device 20 maintain a predetermined distance supported by the NFC network and establish the NFC network.

Further, in operation 403, the first communication device 10 provides the second communication device 20 with predetermined data through the connected NFC network. The data provided through the NFC network may include a first IP address used for connection of the first communication network 30.

Further, the operation of the data file transmission application may be performed using a standard file transmission protocol, such as HyperText Transfer Protocol (HTTP), or File Transfer Protocol (FTP). Accordingly, data transmitted through the NFC network may further include information of the type of the communication application determined in operation 402 and a port address used for execution of a protocol used for an operation of a data file transmission application.

In addition, the data transmitted through the NFC network may further include file information of a data file to be transmitted. The file information may include a filename of the data file to be transmitted and a route, e.g. a Uniform Resource Locator (URL), in which the data file to be transmitted is stored.

The data transmitted through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the first communication device can transmit the first IP address information to the second communication device 20. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the first communication device 10 may further transmit a port address used for execution of a protocol used in the operation of a data file transmission application. Therefore, the first communication device 10 may further transmit port information, as well as the IP address information, through the second communication network 40, wherein the port information may be transmitted or received using the data transmission/reception message 300 described above. Since the first communication device 10 and the second communication device 20 may use a TCP or UDP connection according to a protocol used in the operation of a data file transmission application, the data transmission/reception message 300 may be configured by including an indicator, e.g. "TCP" or "UDP", for identifying the port in the data identifier field 301 and a port address in the data field 302. For example, the first communication device 10 may use a TCP connection with the second communication device 20 when the first communication device 10 needs to assure a reliable delivery of data. Also, the first communication device 10 may use a UDP connection with the second communication device 20 when the first communication device 10 needs to transmit and receive a real-time data.

Further, the first communication device 10 may further transmit a communication application identifier for identifying a communication application, wherein the communication application identifier may be transmitted or received using the data transmission/reception message 300 described above. That is, the first communication device 10 may configure a data transmission/reception message 300 by including an indicator, e.g. Way, indicating that it is an identifier of a communication application in the data identifier field 301 and a communication application identifier, a value of "1", indicating that it is a data file transmission application for transmitting a data file, in the data field 302, and then transmit the configured data transmission/reception message 300 to the second communication device 20 through the second communication network 40.

Since the first communication device 10 has connected the NFC network with the second communication device 20 in order to transmit predetermined data, such as IP address information, the first communication device 10 need not maintain the NFC network with the second communication device 20 when the transmission of the predetermined data, such as IP address information, to the second communication device 20 has been completed. Therefore, the method may further include operation 403 in which the first communication device 10 identifies that the transmission of the predetermined data, such as IP address information, to the second communication device 20 has been completed.

Next, in operation 404, the first communication device 10 starts an operation of a server, corresponding to the communication application type, for transmitting a data file. In this event, the first communication device 10 may set a server by using the first IP address, a port address, etc. in consideration of a protocol used in the operation of the data file transmission application.

Further, in operation 405, the first communication device 10 may perform and/or execute the communication application to transmit a data file to the second communication device 20 by using the first IP address and based on the protocol used in the data file transmission application. For example, the data file transmitted to the second communication device 20 may be selected by the second communication device 20. That is, the second communication device 20, which has received the file information, e.g. a filename of a data file to be transmitted, a route through which the data file to be transmitted is stored, URL, etc., may select a file to be received and then request information of the selected file from the first communication device 10 by using the first IP address. Then, the first communication device 10 may transmit the requested file to the second communication device 20.

For example, the server set in consideration of the protocol used in the operation of the data file transmission application may be an HTTP server and the port address may be a TCP port address. Further, as the first communication device 10 receives an HTTP GET request message including file information of a file to be received from the second communication device 20 set as an HTTP client, the first communication device 10 may identify the file information included in the HTTP GET request message and transmit a corresponding file to the second communication device 20 set as an HTTP client.

In this way, when the operation of transmitting the data file in operation 405 is completed, the first communication device 10 terminates the operation as the server for processing a protocol used in the data file transmission application in operation 406.

Meanwhile, the operation of the second communication device 20 processing the data file transmission application is illustrated in FIG. 4B.

Referring to FIG. 4B, the second communication device 20 connects to the first communication network 30 through a first communication scheme and identifies a second IP address used in the connection in operation 411. The identified second IP address may be an IP address allocated based on the first communication device 10 or an IP address allocated based on the first communication network 30.

The first communication network 30 may be a mobile communication network, e.g. a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition. Further, although the present embodiment is based on an example in which the second communication device 20 is directly connected to the first communication network 30, which is the same as the network connected to the first communication device 10, the present disclosure is not limited to this example. In other words, since the second communication device 20 needs only to be connected to the first communication device 10 by using the first IP address and the second IP address in order to execute a data file transmission application, it goes without saying that the second communication device 20 may be indirectly connected to the first communication network 30.

Further, the first IP address may be an IP address based on IPv6. As another example, the first IP address may be an IP address based on IPv4 and, particularly, may include a public IPv4 address.

Next, in operation 412, the second communication device 20 receives data through the second communication network 40 connected to the first communication device 10. The second communication network 40 may be a network which transmits and receives data through an NFC scheme. Therefore, in order to enable the second communication device 20 to receive the data from the first communication device 10, a connection of an NFC network between the first communication device 10 and the second communication device 20 is needed in operation 412. To this end, the communication method includes operation 412 in which the first communication device 10 and the second communication device 20 maintain a predetermined distance supported by the NFC network and establish the NFC network.

Further, in operation 412, the second communication device 20 receives IP address information from the first communication device 10 through the connected NFC network.

The data received through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the second communication device 20 can receive the first IP address information. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the data transmission/ reception message 300 may further include a port address needed for execution of a protocol used in the operation of a data file transmission application. Therefore, the data transmission/reception message 300 may further include port information as well as IP address information. Since the first communication device 10 and the second communication device 20 may use a TCP or UDP connection according to the protocol used in the operation of a data file transmission application, an indicator, e.g. "TCP" or "UDP", for identifying the port may be included in the data identifier field 301 and a port address may be included in the data field 302. For example, the second communication device 20 may use a TCP connection with the first communication device 10 when the second communication device 20 needs to assure a reliable delivery of data. Also, the second communication device 20 may use a UDP connection with the first communication device 10 when the second communication device needs to transmit and receive a real-time data.

Further, the data transmission/reception message 300 may further include a communication application identifier for identifying a communication application. Specifically, the data identifier field 301 may include an indicator, e.g. Way, indicating that it is an identifier of a communication application, and the data field 302 may include a communication application identifier, a value of "1", indicating that it is a data file transmission application for transmitting a data file.

Since the second communication device 20 has connected the NFC network with the first communication device 10 in order to receive IP address information, the second communication device 20 need not maintain the NFC network with the first communication device 10 when the reception of the IP address information from the first communication device 10 has been completed. Therefore, the method may further include, in operation 412, the second communication device 20 determines that the reception of the IP address information from the first communication device 10 has been completed, and then disconnects the connection of the NFC network.

Next, in operation 413, the second communication device 20 identifies the communication application type, e.g. data file transmission type, by identifying the identifier of the communication application type among the information included in the IP address information.

In operation 414, the second communication device 20 starts an operation of a client, corresponding to the communication application type, for receiving a data file. In this event, the second communication device 20 may set an operation environment by using the first IP address and the port address.

Further, in operation 415, the second communication device 20 may receive a data file transmitted from the first communication device 10 by using the first IP address and based on the protocol used in the data file transmission application. For example, the data file transmitted from the first communication device 10 may be selected by the second communication device 20. That is, the second communication device 20, which has received the file information, e.g. a filename of a data file to be transmitted, a route through which the data file to be transmitted is stored, URL, etc., in operation 412, may select a file to be received. For example, the second communication device 20 may provide a user with the file information, e.g. a filename of a data file to be transmitted, a route through which the data file to be transmitted is stored, URL, etc., so as to enable the user to select a file to be received, or select a file satisfying a predetermined condition. Further, the second communication device 20 may operate as a client based on a standard file transmission protocol using the first IP address and thus request the first communication device 10 to provide the selected file. further, the second communication device 20 may receive the requested file from the first communication device 10.

For example, the client based on the standard file transmission protocol may be an HTTP client and the port address may be a TCP port address. Further, the second communication device 20 operating as an HTTP client transmits an HTTP GET request message to the first communication device 10 set as an HTTP server. Further, the second communication device 20 may receive a corresponding file through HTTP. In this event, the HTTP GET request message may include file information of the selected file, and the file information may include a filename of the data file to be transmitted and a route through which the data file to be transmitted has been stored.

The operation of receiving a data file by using the HTTP client, in operation 415, may be progressed up to when reception of at least one data file, which has been requested through the HTTP GET request message, is completed. When reception of the at least one data file has been completed, the second communication device 20 proceeds to operation 416, in which the second communication device 20 terminates the operation of the HTTP client.

Figure 5A:
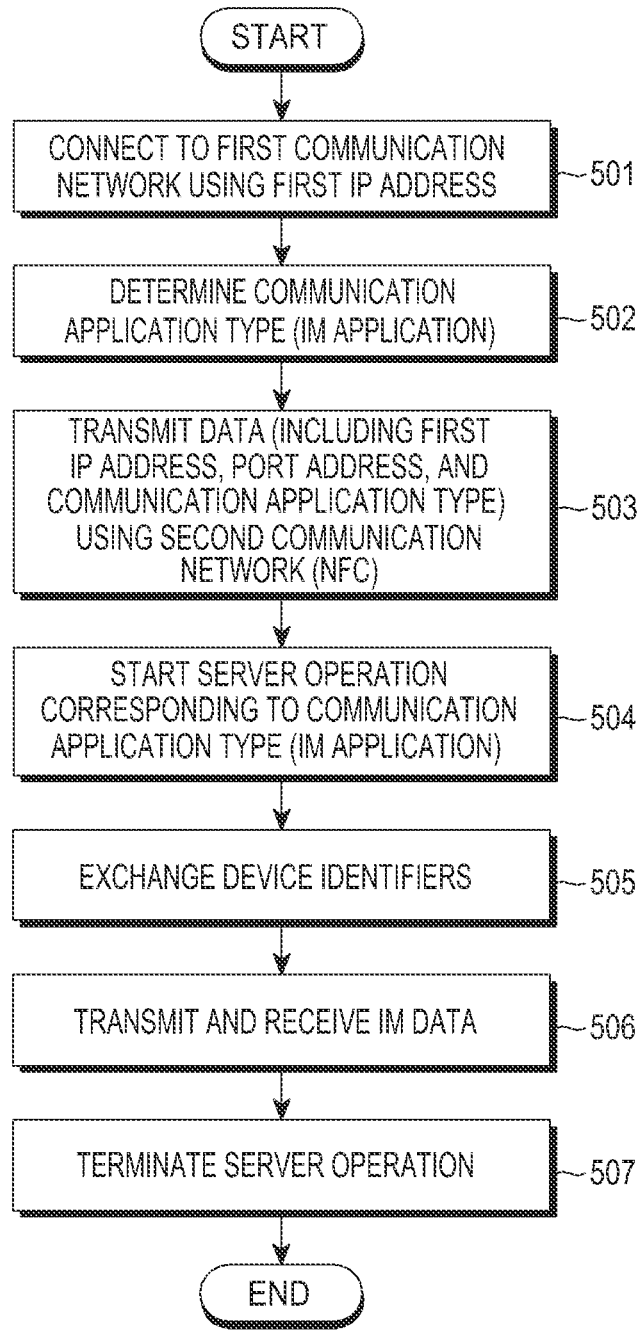
FIG. 5A is a flowchart showing an operation of a first communication device in a communication method according to a second embodiment of the present disclosure.
Figure 5B:
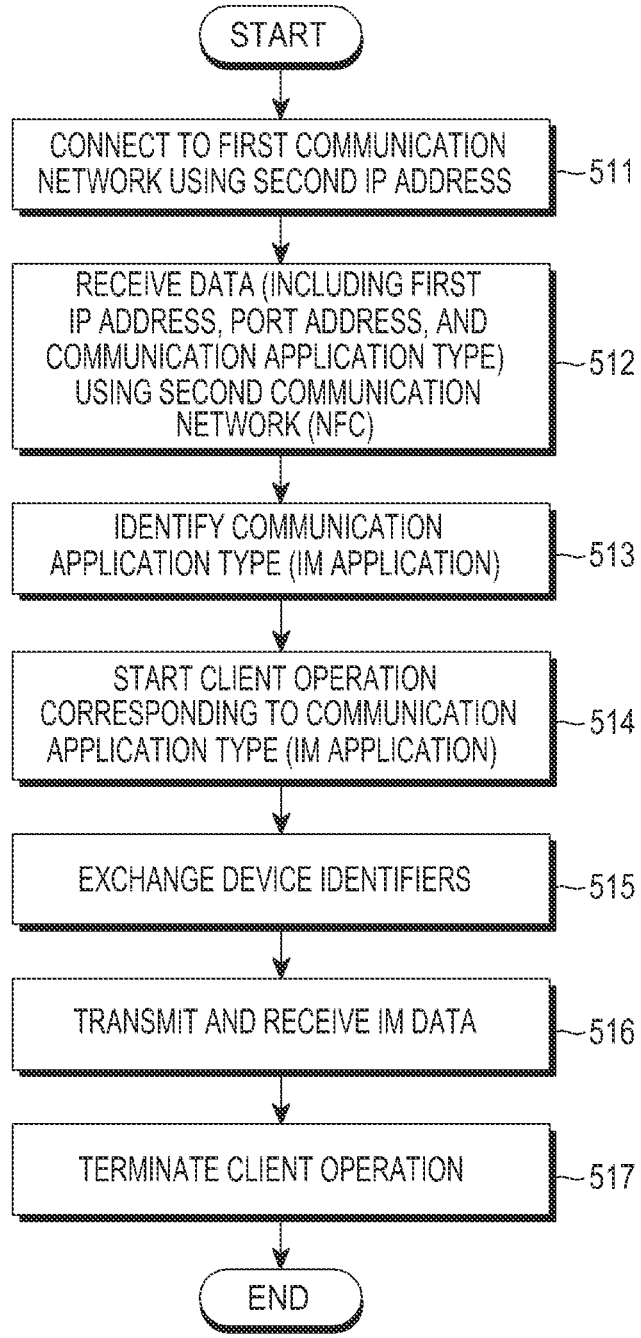
FIG. 5B is a flowchart showing an operation of a second communication device in a communication method according to the second embodiment of the present disclosure.

FIG. 5A is a flowchart showing an operation of a first communication device in a communication method according to a second embodiment of the present disclosure, and FIG. 5B is a flowchart showing an operation of a second communication device in a communication method according to a second embodiment of the present disclosure.

The following description of the communication method according to the second embodiment of the present disclosure is based on an example in which it is applied to an IM application by which the first communication device 10 and the second communication device 20 transmit or receive an instant message.

Referring to FIG. 5A, first, the first communication device 10 connects to the first communication network 30 through a first communication application in operation 501. At the time of connection to the first communication network 30, the first communication device 10 identifies a first IP address allocated to the first communication device 10. The identified first IP address may be an IP address allocated based on the first communication device 10 or an IP address allocated based on the first communication network 30.

The first communication network 30 may be a mobile communication network, e.g. a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition.

Next, in operation 502, the first communication device 10 determines the type of a communication application. For example, the type of the communication application may be determined according to a user's input of an operation of an application or a menu provided by the first communication device 10. The communication method according to the first embodiment of the present disclosure is based on an example in which it is applied to an IM application, and may be determined as the user selects an IM application among applications or in a menu arranged in the first communication device 10.

In operation 503, the first communication device 10 transmits data to the second communication device 20, or in other words, provides the second communication device 20 with data, including IP address information using the second communication network 40. The second communication network 40 may be a network which transmits and receives data through an NFC scheme. Therefore, in order to enable the first communication device 10 to provide data to the second communication device 20, a connection of an NFC network between the first communication device 10 and the second communication device 20 is needed. To this end, the communication method includes operation 503 in which the first communication device 10 and the second communication device 20 maintain a predetermined distance supported by the NFC network and establish the NFC network.

Further, in operation 503, the first communication device 10 provides the second communication device 20 with data through the connected NFC network. The data transmitted through the NFC network may include a first IP address used for connection of the first communication network 30.

Further, the operation of the IM application may be performed using a standard messaging protocol. Accordingly, data transmitted through the NFC network may further include information of the type of the communication application determined in operation 502 and a port address needed for execution of a protocol used for application of a data file transmission application.

The data transmitted through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the first communication device can transmit the first IP address information to the second communication device 20. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the first communication device 10 may further transmit a port address used for execution of a protocol used in the operation of the IM application. Therefore, the first communication device 10 may further transmit port information, as well as the IP address information, through the second communication network 40, wherein the port information may be transmitted or received using the data transmission/reception message 300 described above. Since the first communication device 10 and the second communication device 20 may use a TCP or UDP connection according to the protocol used in the operation of the IM application, the data transmission/reception message 300 may be configured by including an indicator, e.g. "TCP" or "UDP", for identifying the port in the data identifier field 301 and a port address in the data field 302. For example, the first communication device 10 may use a TCP connection with the second communication device 20 when the first communication device 10 needs to assure a reliable delivery of data. Also, the first communication device 10 may use a UDP connection with the second communication device 20 when the first communication device 10 needs to transmit and receive a real-time data.

Further, the first communication device 10 may further transmit a communication application identifier for identifying a communication application, wherein the communication application identifier may be transmitted or received using the data transmission/reception message 300 described above. That is, the first communication device 10 may configure a data transmission/reception message 300 by including an indicator, e.g. Way, indicating that it is an identifier of a communication application in the data identifier field 301 and a communication application identifier, a value of "2", indicating that it is an IM application, in the data field 302, and then transmit the configured data transmission/reception message 300 to the second communication device 20 through the second communication network 40.

Since the first communication device 10 has connected the NFC network with the second communication device 20 in order to transmit data, such as IP address information, the first communication device 10 need not maintain the NFC network with the second communication device 20 when the transmission of the predetermined data, such as IP address information, to the second communication device 20 has been completed. Therefore, the method may further include, in operation 503, the first communication device 10 identifying that the transmission of the predetermined data, such as IP address information, to the second communication device 20 has been completed, and then disconnecting the connection of the NFC network.

Next, in operation 504, the first communication device 10 starts an operation of a server, corresponding to the communication application type, for transmitting and receiving data generated during the operation of the IM application. In this event, the first communication device 10 may set a server by using the first IP address, a port address, etc. in consideration of a protocol used in the operation of the IM application.

Further, in operation 505, the first communication device 10 exchanges device identifiers for performing an IM application with the second communication device 20. The exchange of the device identifiers may be performed based on a protocol used in the IM application and using the first IP address.

Since the first communication device 10 and the second communication device 20 need to secure their device identifiers in order to perform an IM application, the first communication device 10 and the second communication device 20 need to assure reliability between them. Therefore, it is preferred that a protocol assuring reliability between the first communication device 10 and the second communication device 20 is applied to the operation of exchanging the device identifiers. For example, the first communication device 10 and the second communication device 20 may exchange their device identifiers by using TCP. Specifically, the first communication device 10 may transmit a TCP port address to the second communication device 20 in operation 503, and then start to operate as a TCP server in operation 504.

Further, in operation 505, the first communication device 10 may receive a connection request using the first IP address and a TCP port address from the second communication device 20. In this procedure, the first communication device 10 may receive an identifier, e.g., a second device identifier, of the second communication device 20 from the second communication device 20. Further, the first communication device 10 may transmit a response to the connection request to the second communication device 20, while providing the second communication device 20 with an identifier, e.g., a first device identifier, of the first communication device 10. The first device identifier may be a phone number allocated to the first communication device 10 and the second device identifier may be a phone number allocated to the second communication device 20.

Next, in operation 506, the first communication device 10 transmits and receives IM data, which is generated while the first communication device 10 performs the IM application with the second communication device 20.

In performing the IM application, each of the first communication device 10 and the second communication device 20 need to determine whether transmitted IM data has been successfully delivered to their counterpart device. Therefore, the operations of transmitting and receiving IM data by the first communication device 10 and the second communication device 20 also need to assure reliability between them. Therefore, it is preferred that a protocol assuring the reliability is applied to the operations of transmitting and receiving IM data by the first communication device 10 and the second communication device 20. For example, the first communication device 10 and the second communication device 20 may transmit or receive IM data by using TCP. In transmitting or receiving the IM data, the first communication device 10 may operate as a TCP server and the second communication device 20 may operate as a TCP client.

For example, the transmission or reception of the IM data may be performed using the message shown in FIG. 5C.

FIG. 5C illustrates an example of a data message format used in a communication method according to the second embodiment of the present disclosure.

Referring to FIG. 5C, in order to participate in the IM data transmission or reception, it is possible to configure the message by including an identifier, e.g. "0", indicating an IM participation request in an element type field 550 of the message, including a length value of the element in an element length field 551 of the message, and including an identifier of the device, e.g. an identifier of the second communication device 20, which is to participate in the IM data transmission or reception, in an element value field 552 of the message. The first communication device 10 may start the transmission or reception of the IM data by transmitting the configured message to the second communication device 20.

Further, the first communication device 10 may transmit contents of the IM data input by the user to the second communication device 20 through the message. For example, the first communication device 10 may configure the message by including an identifier, e.g. "2", indicating IM transmission in the element type field 550 of the message, including a length value of the element in the element length field 551 of the message, and including an identifier of the device, e.g. the identifier of the second communication device 20, to which the IM data is to be transmitted, in the element value field 552 of the message. By transmitting the configured message to the second communication device 20, the first communication device 10 may transmit or receive the IM data input by the user. As another example, it goes without saying that, through the message transmitted from the second communication device 20, the first communication device 10 can receive and display contents of IM data input by a user of the second communication device 20.

Further, the transmission or reception of the IM data may be terminated using the message shown in FIG. 5C. First, in order to terminate the IM data transmission or reception, it is possible to configure a message by including an identifier, e.g. "1", indicating an IM termination request in the element type field 550 of the message, including a length value of the element in the element length field 551 of the message, and including an identifier of the device, e.g. the identifier of the second communication device 20, which is a target of termination of the IM data transmission or reception, in the element value field 552 of the message. By transmitting the configured message to the second communication device 20, the first communication device 10 may terminate the transmission or reception of the IM data.

In this way, when the operation of transmitting the IM data, in operation 506, is completed, the first communication device 10 terminates the operation as the server for processing a protocol used in the IM application in operation 507.

Meanwhile, the operation of the second communication device 20 processing the IM application is illustrated in FIG. 5B.

Referring to FIG. 5B, the second communication device 20 connects to the first communication network 30 through a first communication scheme and identifies a second IP address used in the connection. The identified second IP address may be an IP address allocated based on the first communication device 10 or an IP address allocated based on the first communication network 30.

The first communication network 30 may be a mobile communication network, e.g. a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition. Further, although the present embodiment is based on an example in which the second communication device 20 is directly connected to the first communication network 30 which is the same as the network connected to the first communication device 10, the present disclosure is not limited to this example. In other words, since the second communication device 20 needs only to be connected to the first communication device 10 by using the first IP address and the second IP address in order to execute the IM application, it goes without saying that the second communication device 20 may be indirectly connected to the first communication network 30.

Further, the first IP address may be an IP address based on IPv6. As another example, the first IP address may be an IP address based on IPv4 and, particularly, may include a public IPv4 address.

Next, in operation 512, the second communication device 20 receives data using the second communication network 40 connected to the first communication device 10. The second communication network 40 may be a network which transmits and receives data through an NFC scheme. Therefore, in order to enable the second communication device 20 to receive the data from the first communication device 10, a connection of an NFC network between the first communication device 10 and the second communication device 20 is needed in operation 512. To this end, the communication method includes operation 512 in which the first communication device 10 and the second communication device 20 maintain a predetermined distance supported by the NFC network and establish the NFC network.

Further, in operation 512, the second communication device 20 receives IP address information from the first communication device 10 through the connected NFC network.

The data received through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the second communication device 20 can receive the first IP address information. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the data transmission/reception message 300 may further include a port address required for execution of a protocol used in the operation of the IM application. Therefore, the data transmission/reception message 300 may further include port information as well as the IP address information. Since the first communication device 10 and the second communication device 20 may use a TCP or UDP connection according to the protocol used in the operation of the IM application, an indicator, e.g. "TCP" or "UDP", for identifying the port may be included in the data identifier field 301 and a port address may be included in the data field 302. For example, the second communication device 20 may use a TCP connection with the first communication device 10 when the second communication device 20 needs to assure a reliable delivery of data. Also, the second communication device 20 may use a UDP connection with the first communication device 10 when the second communication device needs to transmit and receive a real-time data.

Further, the data transmission/reception message 300 may further include a communication application identifier for identifying an IM application. Specifically, the data identifier field 301 may include an indicator, e.g. Way, indicating that it is an identifier of a communication application, and the data field 302 may include a communication application identifier, a value of "2", indicating that it is an IM application.

Since the second communication device 20 has connected the NFC network with the first communication device 10 in order to receive IP address information, the second communication device 20 need not maintain the NFC network with the first communication device 10 when the reception of the IP address information from the first communication device 10 has been completed. Therefore, the method may further include, in operation 512, the second communication device 20 identifying that the reception of the IP address information from the first communication device 10 has been completed, and then disconnecting the connection of the NFC network.

Next, in operation 513, the second communication device 20 identifies the communication application type, e.g. IM application, by identifying the identifier of the communication application type among the information included in the IP address information.

Next, in operation 514, the first communication device 20 starts an operation of a client corresponding to the communication application type for transmitting and receiving data generated during the operation of the IM application. In this event, the first communication device 20 may set a client by using the first IP address, a port address, etc., in consideration of a protocol used in the operation of the IM application.

Further, in operation 515, the second communication device 20 exchanges device identifiers for performing an IM application with the first communication device 10. The exchange of the device identifiers may be performed based on a protocol used in the IM application and using the first IP address.

Since the first communication device 10 and the second communication device 20 need to secure their device identifiers in order to perform the IM application, the first communication device 10 and the second communication device 20 need to assure reliability between them. Therefore, it is preferred that a protocol assuring the reliability between the first communication device 10 and the second communication device 20 is applied to the operation of exchanging the device identifiers. For example, the first communication device 10 and the second communication device 20 may exchange their device identifiers by using TCP. Specifically, the second communication device 20 may receive a TCP port address from the first communication device 10 in operation 513, and then start to operate as a TCP client in operation 514.

Further, in operation 515, the second communication device 20 may transmit a connection request using the first IP address and a TCP port address to the first communication device 10. Specifically, the second communication device 20 may transmit a connection request message including an identifier, which may be referred to as a second device identifier, of the second communication device 20 to the first communication device 10 and receive an identifier, which may be referred to as a first device identifier, of the first communication device 10 from the first communication device 10 as a response to the request. The first device identifier may be a phone number allocated to the first communication device 10 and the second device identifier may be a phone number allocated to the second communication device 20.

Next, in operation 516, the first communication device 10 transmits and receives IM data, which is generated while the first communication device 10 performs the IM application with the second communication device 20. In performing the IM application, each of the first communication device 10 and the second communication device 20 need to determine whether transmitted IM data has been successfully delivered to their counterpart device. Therefore, the operations of transmitting and receiving IM data by the first communication device 10 and the second communication device 20 also need to assure a reliability between them. Therefore, it is preferred that a protocol securing the reliability is applied to the operations of transmitting and receiving IM data by the first communication device 10 and the second communication device 20. For example, the first communication device 10 and the second communication device 20 may transmit or receive IM data by using TCP. In transmitting or receiving the IM data, the first communication device 10 may operate as a TCP server and the second communication device 20 may operate as a TCP client.

In this way, when the operation of transmitting or receiving the IM data in operation 516 is completed, the second communication device 20 terminates the operation as the client for processing a protocol used in the IM application in operation 517.

Figure 6A:
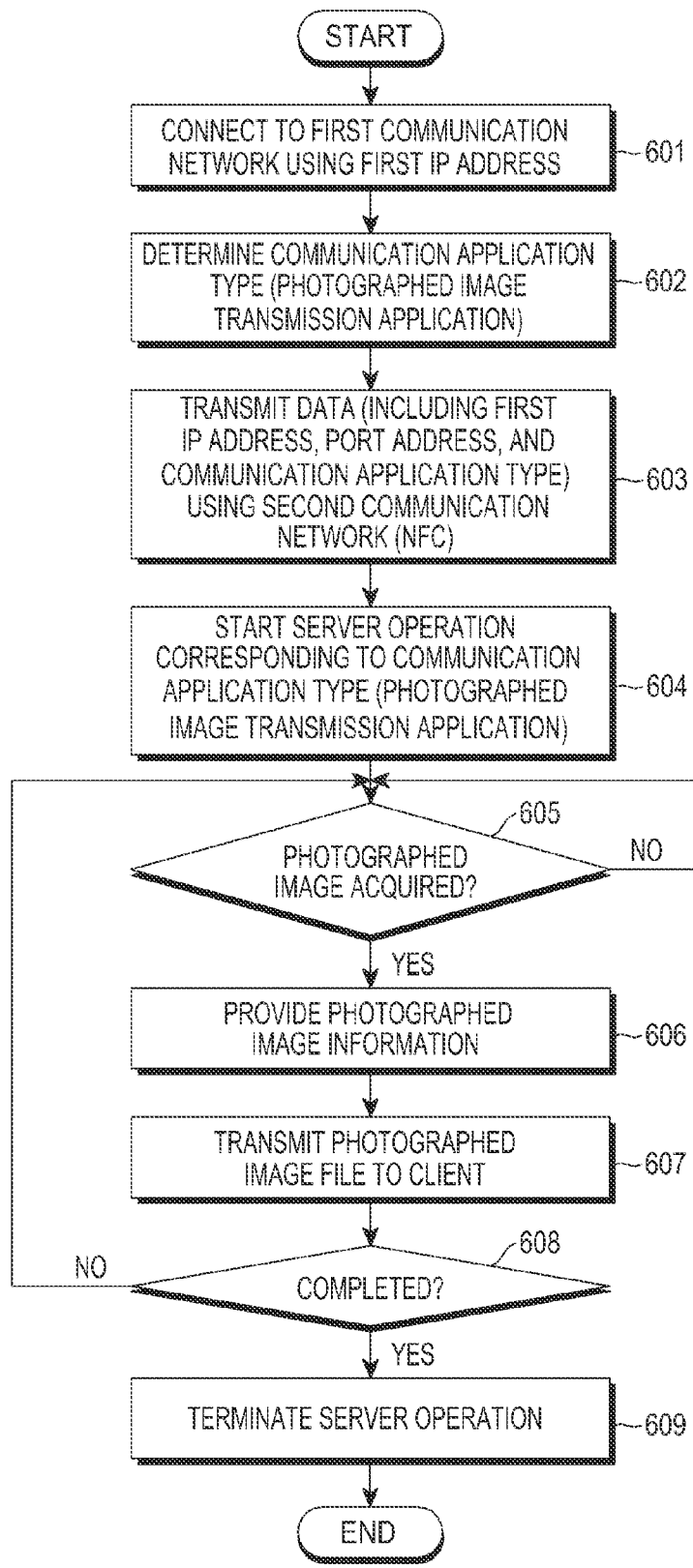
FIG. 6A is a flowchart showing an operation of a first communication device in a communication method according to a third embodiment of the present disclosure.
Figure 6B:
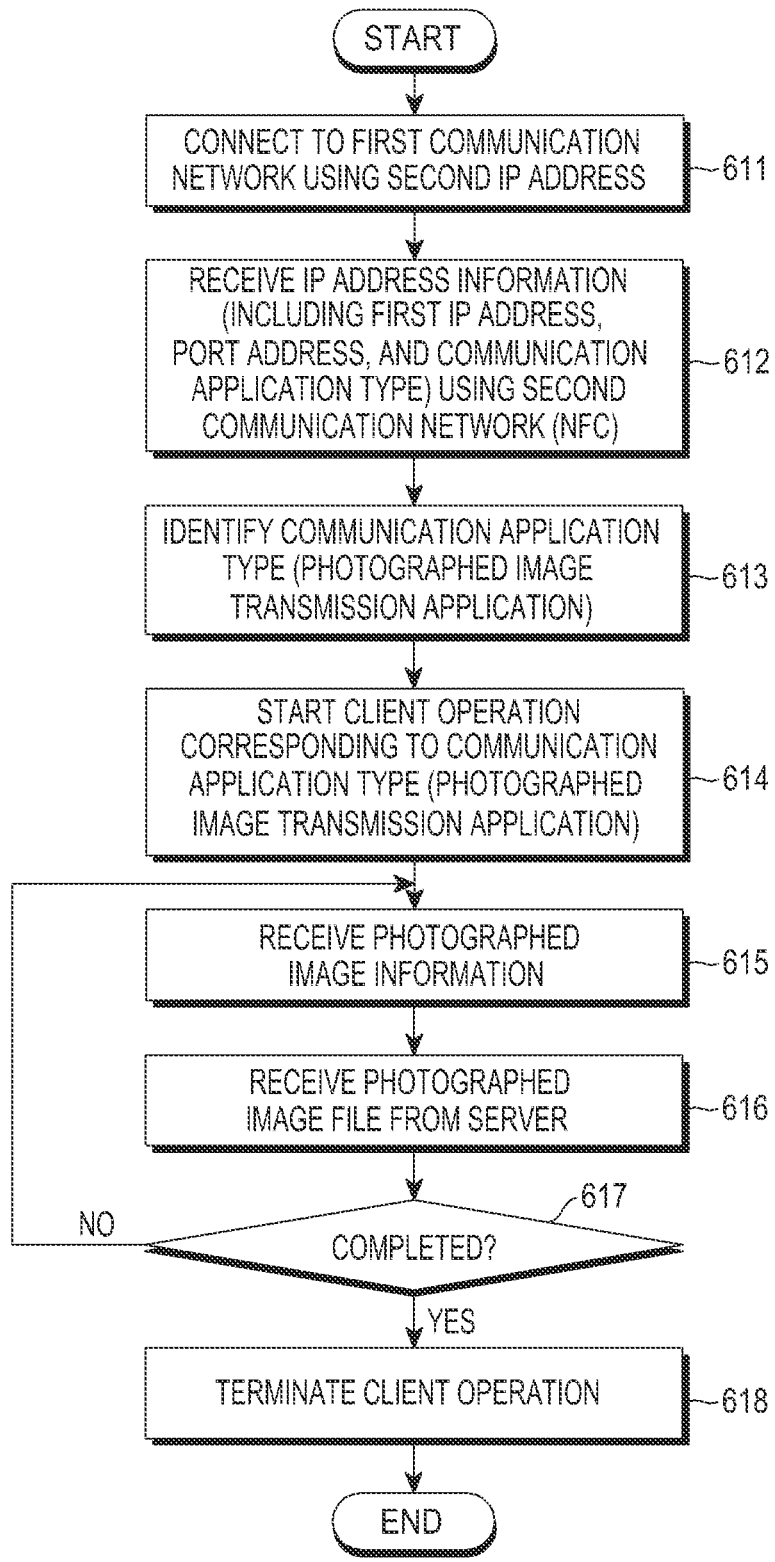
FIG. 6B is a flowchart showing an operation of a second communication device in a communication method according to the third embodiment of the present disclosure.

FIG. 6A is a flowchart showing an operation of a first communication device in a communication method according to a third embodiment of the present disclosure, and FIG. 6B is a flowchart showing an operation of a second communication device in a communication method according to a third embodiment of the present disclosure.

The following description of the communication method according to the third embodiment of the present disclosure is based on an example in which it is applied to a photographed image transmission application for transmitting a photographed image file from the first communication device 10 to the second communication device 20. A photographed image transmission application according to an embodiment of the present disclosure may be an application for automatically transmitting an image acquired by the first communication device 10 to the second communication device 20. For example, the photographed image transmission application may be an application which, when an image is acquired, for example, by photographing, through an image photographing function of the first communication device 10, provides the second communication device 20 with information of the acquired image, so as to enable a real-time transmission and storage of the acquired image by selection of a user of the second communication device 20. For example, the first communication device 10 may be a device having a camera unit (not shown) capable of performing a camera function, which includes a portable terminal, such a mobile communication terminal, a tablet PC, or a camera. Further, the second communication device 20 may be a device having a function capable of receiving and storing an image file provided by the first communication device 10, which includes a television, a PC, a laptop computer, and a set-top box.

Referring to FIG. 6A, the first communication device 10 connects to the first communication network 30 using a first IP address through a first communication application in operation 601. At the time of connection to the first communication network 30, the first communication device 10 identifies the first IP address allocated to the first communication device 10. The identified first IP address may be an IP address allocated based on the first communication device 10 or an IP address allocated based on the first communication network 30.

The first communication network 30 may be a mobile communication network, e.g. a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition.

Further, the first IP address may be an IP address based on IPv6. As another example, the first IP address may be an IP address based on IPv4 and, particularly, may include a public IPv4 address.

Next, in operation 602, the first communication device 10 determines the type of a communication application. For example, the type of the communication application may be determined according to a user's input of an operation of an application or a menu provided by the first communication device 10. The communication method according to the third embodiment of the present disclosure is based on an example in which it is applied to a photographed image transmission application, and may be determined as the user selects a photographed image transmission application among applications or in a menu arranged in the first communication device 10.

Further, in operation 602, as the user selects a photographed image transmission application, an operation of the photographed image transmission application may start.

In operation 603, the first communication device 10 provides the second communication device 20 with data through the second communication network 40. The second communication network 40 may be a network which transmits and receives data through an NFC scheme. Therefore, in order to enable the first communication device 10 to provide data to the second communication device 20, a connection of an NFC network between the first communication device 10 and the second communication device 20 is needed. To this end, the communication method includes operation 603 in which the first communication device 10 and the second communication device 20 maintain a predetermined distance supported by the NFC network and establish the NFC network.

Further, in operation 603, the first communication device 10 transmits and/or provides the second communication device 20 with data through the connected NFC network. The data transmitted through the NFC network may include a first IP address used for connection of the first communication network 30.

Further, the operation of the photographed image transmission application may be performed using a standard file transmission protocol, such as HTTP or FTP. Accordingly, data transmitted through the NFC network may further include information of the type of the communication application determined in operation 602 and a port address needed for execution of a protocol used for an operation of the photographed image transmission application.

The data transmitted through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the first communication device can transmit the first IP address information to the second communication device 20. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the first communication device 10 may further transmit a port address required for execution of a protocol used in the operation of the photographed image transmission application. Therefore, the first communication device 10 may further transmit port information, as well as the IP address information, through the second communication network 40, wherein the port information may be transmitted or received using the data transmission/reception message 300 described above. Since the first communication device 10 and the second communication device 20 may use a TCP or UDP connection according to a protocol used in the operation of a photographed image transmission application, the data transmission/reception message 300 may be configured by including an indicator, e.g. "TCP" or "UDP", for identifying the port in the data identifier field 301 and a port address in the data field 302. For example, the first communication device 10 may use a TCP connection with the second communication device 20 when the first communication device 10 needs to assure a reliable delivery of data. Also, the first communication device 10 may use a UDP connection with the second communication device 20 when the first communication device 10 needs to transmit and receive a real-time data.

Further, the first communication device 10 may further transmit a communication application identifier for identifying a communication application, wherein the communication application identifier may be transmitted or received using the data transmission/reception message 300 described above. That is, the first communication device 10 may configure a data transmission/reception message 300 by including an indicator, e.g. Way, indicating that it is an identifier of a communication application in the data identifier field 301 and a communication application identifier, a value of "3", indicating that it is an photographed image transmission application, in the data field 302, and then transmit the configured data transmission/reception message 300 to the second communication device 20 through the second communication network 40.

Since the first communication device 10 has connected the NFC network with the second communication device 20 in order to transmit predetermined data, such as IP address information, the first communication device 10 need not maintain the NFC network with the second communication device 20 when the transmission of the predetermined data, such as IP address information, to the second communication device 20 has been completed. Therefore, the method may further include, in operation 603, the first communication device 10 identifying that the transmission of the predetermined data, such as IP address information, to the second communication device 20 has been completed, and then disconnecting the connection of the NFC network.

Next, in operation 604, the first communication device 10 starts an operation of a server corresponding to the communication application type for transmitting an image. In this event, the first communication device 10 may set a server by using the first IP address, a port address, etc. in consideration of a protocol used in the operation of the photographed image transmission application.

In operation 605, the first communication device 10 determines whether an image file, or in other words a photographed image, is acquired. The acquired image may be an image taken in real time by a camera provided at the first communication device 10. Therefore, operation 605 may be progressed as the first communication device 10 provides an application or a menu for starting an operation of a camera, an application or a menu for starting the operation of the camera is selected by a user, and then the image is photographed.

Further, as an alternative, the acquired image file may correspond to at least one image selected from previously photographed and stored images or at least one image received from an external device. Therefore, operation 605 may be progressed as the first communication device 10 provides an environment, menu, or application, in which at least one image can be selected from one or more photographed images stored in the first communication device 10, and the at least one image is then selected by a user, or the first communication device 10 provides an environment, menu, or application, in which at least one image can be received from an external device, and at least one image is then received.

Next, in operation 606, the first communication device 10 operating as the server provides photographed image information of the acquired image to the second communication device 20 operating as a corresponding client. The image information may include, for example, a filename and a storage route of the image file. The image information may be transmitted using a message format as shown in FIG. 6C.

Further, operation 606 may be performed using a protocol securing a connectivity. Therefore, operations 603, 604, and 606 may further include an operation of connection based on the protocol securing the connectivity. For example, in operation 603, the first communication device 10 may further transmit port information, e.g. TCP port information, to be used for the protocol securing the connectivity. Further, the first communication device 10 operates as a server, e.g. a TCP server, based on a protocol assuring the reliability in operation 604, and connects with a TCP client in operation 606. In operation 606, the first communication device 10 receives a connection request message transmitted from the second communication device 20 operating as a TCP client and transmits a response message to the request message, so as to maintain the TCP connection with the second communication device 20. Further, the first communication device 10 may transmit the image information in the state in which the TCP connection is maintained.

Next, in operation 607, the first communication device 10 transmits at least one image, such as the photographed image file to the client, the transmission of which is requested by the second communication device 20. In this event, the first communication device 10 may transmit the image to the second communication device 20 by using the first IP address and based on a protocol used in the first IP address photographed image transmission application.

For example, at least one image transmitted to the second communication device 20 may be selected by the second communication device 20. That is, the second communication device 20, which has received the image information, e.g. a filename of an image file to be transmitted, a route through which the image file to be transmitted is stored, URL, etc., may select an image file to be received and then request information of the selected image file from the first communication device 10 by using the first IP address. Then, the first communication device 10 may transmit the requested image file to the second communication device 20.

For example, a server set in consideration of the protocol used in the image file transmission operation of the photographed image transmission application may be an HTTP server. Therefore, the first communication device 10 may be configured to perform an operation of an HTTP server as well as an operation of a TCP server in operation 604. Further, in operation 607, the first communication device 10 may receive file information of the image file to be received from the second communication device 20 set as an HTTP client, through an HTTP GET request message. Further, the first communication device 10 may identify image information included in the HTTP GET request message and transmit a corresponding file to the second communication device 20 set as the HTTP client.

The operations 605 to 607 for transmitting the photographed image as described above may be repeated until the operation of the photographed image transmission application is determined to be completed or terminated in operation 608. Further, when the operation of the photographed image transmission application is completed or terminates, the first communication device 10 terminates the operation as the server for processing the protocol used in the photographed image transmission application operation 609.

The completion or termination of the operation of the photographed image transmission application may be determined either when the user inputs a termination of the photographed image transmission application by using a UI or menu provided at the first communication device 10 or when a standby state has been maintained for a predetermined time, e.g. 5 minutes, without an operation of the photographed image transmission application. As an alternative, when a user inputs a termination of the photographed image transmission application by using a UI or menu provided at the second communication device 20, the operation of the photographed image transmission application may be determined as having been terminated. In this event, the first communication device 10 may terminate the operation of the photographed image transmission application of the first communication device 10 by receiving a command indicating termination of the photographed image transmission application from the second communication device 20.

Meanwhile, the operation of the second communication device 20 processing the photographed image transmission application is illustrated in FIG. 6B.

Referring to FIG. 6B, the second communication device 20 connects to the first communication network 30 through a first communication scheme and identifies a second IP address used in the connection in operation 611. The identified second IP address may be an IP address allocated based on the first communication device 10 or an IP address allocated based on the first communication network 30.

The first communication network 30 may be a mobile communication network, such as a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition. Further, although the present embodiment is based on an example in which the second communication device 20 is directly connected to the first communication network 30 which is the same as the network connected to the first communication device 10, the present disclosure is not limited to this example. In other words, since the second communication device 20 needs only to be connected to the first communication device 10 by using the first IP address and the second IP address in order to execute a photographed image transmission application, it goes without saying that the second communication device 20 may be indirectly connected to the first communication network 30.

Further, the first IP address may be an IP address based on IPv6. As another example, the first IP address may be an IP address based on IPv4 and, particularly, may include a public IPv4 address.

Next, in operation 612, the second communication device 20 receives data, such as IP address information, using the second communication network 40 connected to the first communication device 10. The second communication network 40 may be a network which transmits and receives data through an NFC scheme. Therefore, in order to enable the second communication device 20 to receive the predetermined data from the first communication device 10, a connection of an NFC network between the first communication device 10 and the second communication device 20 is needed in operation 612. To this end, the communication method includes operation 612 in which the first communication device 10 and the second communication device 20 maintain a predetermined distance supported by the NFC network and establish the NFC network.

Further, in operation 612, the second communication device 20 receives IP address information from the first communication device 10 through the connected NFC network.

The data received through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the second communication device 20 can receive the first IP address information. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the data transmission/reception message 300 may further include a port address needed for execution of a protocol used in the operation of the photographed image transmission application. Therefore, the data transmission/reception message 300 may further include port information as well as the IP address information. Since the first communication device 10 and the second communication device 20 may use a TCP or UDP connection according to the protocol used in the operation of the photographed image transmission application, an indicator, e.g. "TCP" or "UDP", for identifying the port may be included in the data identifier field 301 and a port address may be included in the data field 302. For example, the second communication device 20 may use a TCP connection with the first communication device 10 when the second communication device 20 needs to assure a reliable delivery of data. Also, the second communication device 20 may use a UDP connection with the first communication device 10 when the second communication device needs to transmit and receive a real-time data.

Further, the data transmission/reception message 300 may further include a communication application identifier for identifying a communication application. Specifically, the data identifier field 301 may include an indicator, e.g. Way, indicating that it is an identifier of a communication application, and the data field 302 may include a communication application identifier, a value of "3", indicating that it is a photographed image transmission application.

Since the second communication device 20 has connected the NFC network with the first communication device 10 in order to receive IP address information, the second communication device 20 need not maintain the NFC network with the first communication device 10 when the reception of the IP address information from the first communication device 10 has been completed. Therefore, the method may further include, in operation 612, the second communication device 20 identifying that the reception of the IP address information from the first communication device 10 has been completed, and then disconnecting the connection of the NFC network.

Next, in operation 613, the second communication device 20 identifies the communication application type, e.g. photographed image transmission application, by identifying the identifier of the communication application type among the information included in the IP address information.

In operation 614, the second communication device 20 starts an operation of a client for receiving a photographed image. In this event, the second communication device 20 may set an operation environment of the client by using the first IP address and the port address.

Further, in operation 615, the second communication device 20 may receive photographed image information of the image transmitted from the first communication device 10 by using the first IP address and based on the protocol used in the photographed image transmission application. The image information may include, for example, a filename and a storage route of the image file. The image information may be received using a message format as shown in FIG. 6C.

FIG. 6C illustrates an example of a data message format used in a communication method according to the third embodiment of the present disclosure.

Referring to FIG. 6C, the message format may include an element type field 650, an element length field 651, and a element value field 652.

Further, operation 615 may be performed using a protocol securing a connectivity. Therefore, operations 613, 614, and 616 may further include an operation of connection based on the protocol securing the connectivity. For example, in operation 613, the first communication device 20 may further receive port information, e.g. TCP port information to be used for the protocol securing the connectivity. Further, the first communication device 20 operates as a client, e.g. a TCP client, based on a protocol assuring the reliability in operation 614, and connects with the TCP server in operation 615. In operation 615, the second communication device 20 operating as the TCP client transmits a connection request message to the first communication device 10 and receives a response message to the request message. The second communication device 20 operating as the TCP client maintains a TCP-based connection with the first communication device 10 operating as the TCP server and can receive the image information through the TCP-based connection.

Next, in operation 616, the second communication device 20 receives at least one image from the server, e.g., the first communication device 10. In this event, the second communication device 20 may receive the image by using the first IP address and based on the protocol used in the photographed image transmission application.

For example, the second communication device 20 may select at least one image. That is, the second communication device 20 may provide a user with the file information, e.g. a filename of an image file to be transmitted, a route through which the image file to be transmitted is stored, URL, etc., so as to enable the user to select at least one image to be received, or may select at least one image satisfying a predetermined condition. Further, the second communication device 20 may transmit a request for information of the selected image file to the first communication device 10 by using the first IP address. Then, the first communication device 10 may transmit the requested image file to the second communication device 20.

For example, a server set in consideration of the protocol used in the image file transmission operation of the photographed image transmission application may be an HTTP server. Therefore, the second communication device 20 may be configured to perform an operation of an HTTP client as well as an operation of a TCP client in operation 614. Further, in operation 616, the second communication device 20 may transmit file information of the selected image file to the first communication device 10 set as the HTTP server, through an HTTP GET request message. Further, through a response to the HTTP GET request message, the second communication device 20 may receive a corresponding image from the first communication device 10 set as the HTTP server.

The operations 615 and 616 for receiving the photographed image as described above may be repeated until the operation of the photographed image transmission application is determined to be completed or terminated in operation 617. Further, when the operation of the photographed image transmission application is completed or terminates, the first communication device 20 terminates the operation as the client for processing the protocol used in the photographed image transmission application in operation 618.

Figure 7A:
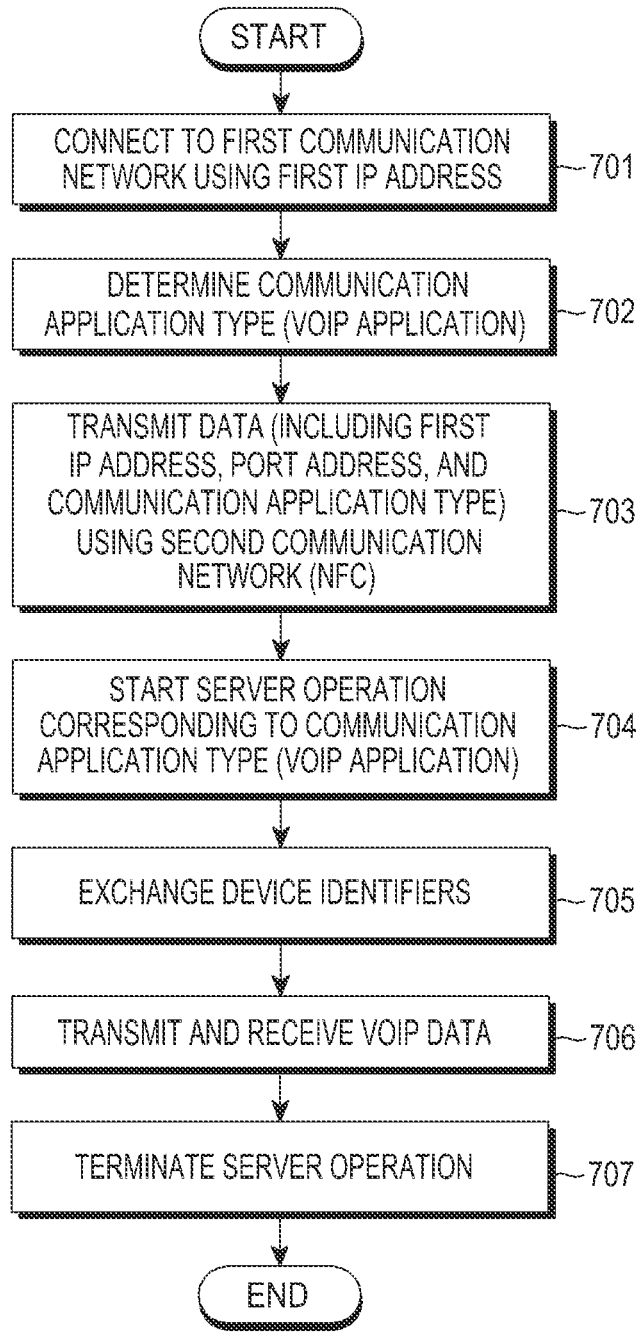
FIG. 7A is a flowchart showing an operation of a first communication device in a communication method according to a fourth embodiment of the present disclosure.
Figure 7B:
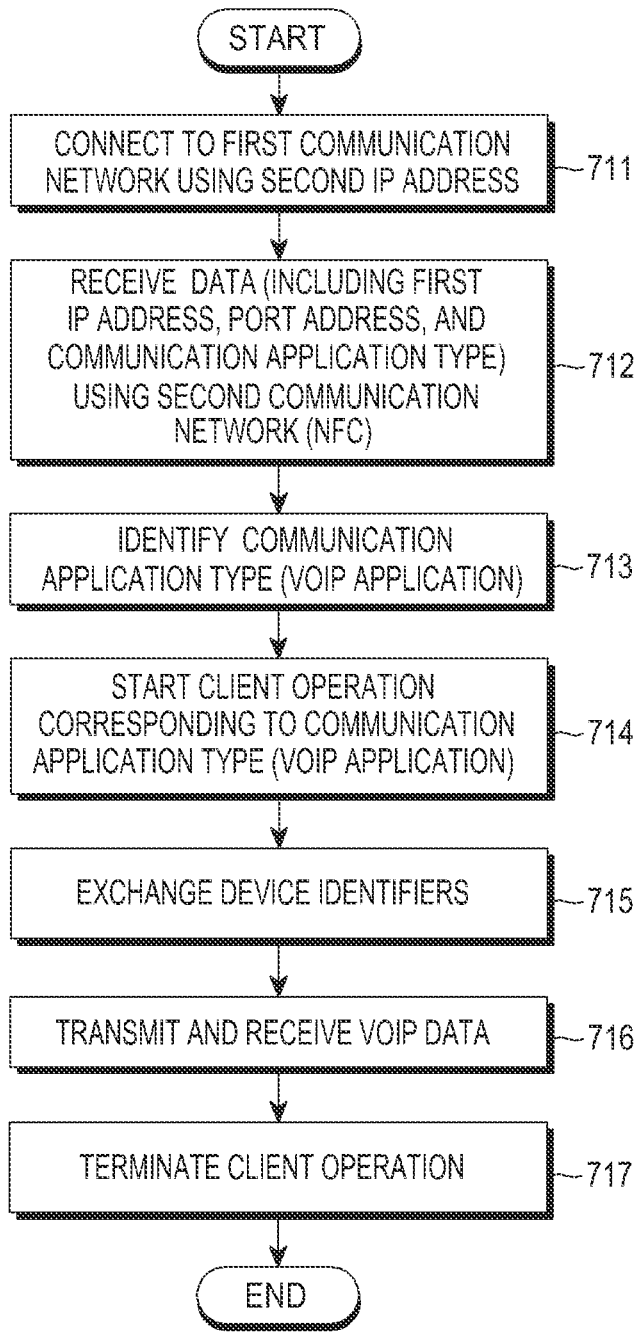
FIG. 7B is a flowchart showing an operation of a second communication device in a communication method according to the fourth embodiment of the present disclosure.

FIG. 7A is a flowchart showing an operation of a first communication device in a communication method according to a fourth embodiment of the present disclosure, and FIG. 7B is a flowchart showing an operation of a second communication device in a communication method according to a fourth embodiment of the present disclosure.

The following description of the communication method according to the fourth embodiment of the present disclosure is based on an example in which it is applied to a VoIP application by which the first communication device 10 and the second communication device 20 transmit or receive VoIP data.

Referring to FIG. 7A, first, the first communication device 10 connects to the first communication network 30 using a first IP Address through a first communication application operation 701. At the time of connection to the first communication network 30, the first communication device 10 identifies the first IP address allocated to the first communication device 10. The identified first IP address may be an IP address allocated based on the first communication device 10 or an IP address allocated based on the first communication network 30.

The first communication network 30 may be a mobile communication network, such as a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition.

Next, in operation 702, the first communication device 10 determines the type of a communication application. For example, the type of the communication application may be determined according to a user's input of an operation of an application or a menu provided by the first communication device 10. The communication method according to the fourth embodiment of the present disclosure is based on an example in which it is applied to a VoIP application, and may be determined as the user selects a VoIP application among applications or in a menu arranged in the first communication device 10.

In operation 703, the first communication device 10 transmits and/or provides the second communication device 20 with data including IP address information through the second communication network 40. The second communication network 40 may be a network which transmits and receives data through an NFC scheme. Therefore, in order to enable the first communication device 10 to provide data to the second communication device 20, a connection of an NFC network between the first communication device 10 and the second communication device 20 is needed. To this end, the communication method includes operation 503 in which the first communication device 10 and the second communication device 20 maintain a predetermined distance supported by the NFC network and establish the NFC network.

Further, in operation 703, the first communication device 10 provides the second communication device 20 with data through the connected NFC network. The data transmitted through the NFC network may include a first IP address used for connection of the first communication network 30.

Further, the operation of the VoIP application may be performed using a standard file transmission protocol, such as TCP or HTTP. Accordingly, data transmitted through the NFC network may further include information of the type of the communication application determined in operation 702 and a port address needed for execution of a protocol used for an operation of the VoIP application.

The data transmitted through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the first communication device can transmit the first IP address information to the second communication device 20. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the first communication device 10 may further transmit a port address required for execution of a protocol used in the operation of the VoIP application. Therefore, the first communication device 10 may further transmit port information, as well as the IP address information, through the second communication network 40, wherein the port information may be transmitted or received using the data transmission/reception message 300 described above. Since the first communication device 10 and the second communication device 20 may use a TCP or UDP connection according to the protocol used in the operation of the VoIP application, the data transmission/reception message 300 may be configured by including an indicator, e.g. "TCP" or "UDP", for identifying the port in the data identifier field 301 and a port address in the data field 302. For example, the first communication device 10 may use a TCP connection with the second communication device 20 when the first communication device 10 needs to assure a reliable delivery of data. Also, the first communication device 10 may use a UDP connection with the second communication device 20 when the first communication device 10 needs to transmit and receive a real-time data.

Further, the first communication device 10 may further transmit a communication application identifier for identifying a communication application, wherein the communication application identifier may be transmitted or received using the data transmission/reception message 300 described above. That is, the first communication device 10 may configure a data transmission/reception message 300 by including an indicator, e.g. Way, indicating that it is an identifier of a communication application in the data identifier field 301 and a communication application identifier, a value of "4", indicating that it is a VoIP application, in the data field 302, and then transmit the configured data transmission/reception message 300 to the second communication device 20 through the second communication network 40.

Since the first communication device 10 has connected the NFC network with the second communication device 20 in order to transmit data, such as IP address information, the first communication device 10 need not maintain the NFC network with the second communication device 20 when the transmission of the data, such as IP address information, to the second communication device 20 has been completed. Therefore, the method may further include, in operation 703, the first communication device 10 identifying that the transmission of the predetermined data, such as IP address information, to the second communication device 20 has been completed, and then disconnecting the connection of the NFC network.

Next, in operation 704, the first communication device 10 starts an operation of a server, corresponding to the communication application type, for transmitting and receiving data generated during the operation of the VoIP application. In this event, the first communication device 10 may set a server by using the first IP address, a port address, etc. in consideration of a protocol used in the operation of the VoIP application.

Further, in operation 705, the first communication device 10 exchanges device identifiers for performing the VoIP application with the second communication device 20. The exchange of the device identifiers may be performed based on a protocol used in the VoIP application and using the first IP address. Since the first communication device 10 and the second communication device 20 need to secure their device identifiers in order to perform the VoIP application, the first communication device 10 and the second communication device 20 need to assure reliability between them. Therefore, it is preferred that a protocol assuring the reliability between the first communication device 10 and the second communication device 20 is applied to the operation of exchanging the device identifiers. For example, the first communication device 10 and the second communication device 20 may exchange their device identifiers by using TCP. Specifically, the first communication device 10 may transmit a TCP port address to the second communication device 20 in operation 703, and then start to operate as a TCP server in operation 704.

Next, in operation 706, the first communication device 10 transmits and receives VoIP data, which is generated while the first communication device 10 performs the VoIP application with the second communication device 20.

For example, first, the first communication device 10 starts to perform a VoIP communication with the second communication device 20. The first communication device 10 may display basic information for connection with the second communication device 20, for example, an identifier of the second communication device 20, or display contact information corresponding to the second communication device. Further, as a user of the first communication device 10 selects the displayed second device identifier, or corresponding contact information, the first communication device 10 may send a message requesting a VoIP communication and may start the VoIP communication according to a response of the second communication device 20 to the call for the VoIP communication. The message shown in FIG. 7C may be used as the message for requesting start of the communication.

FIG. 7C illustrates an example of a data message format used in a communication method according to the fourth embodiment of the present disclosure.

Referring to FIG. 7C, the message for requesting start of the communication may be configured by including an identifier, e.g. "0", indicating a communication start request in an element type field 750 of the message, including a length value of the element in an element length field 751 of the message, and including an identifier of the device, e.g. an identifier of the second communication device 20, which is a target of the communication start request, in an element value field 752 of the message.

Further, the first communication device 10 generates a VoIP data packet including a voice signal input through a microphone (not shown) arranged at the first communication device 10 and transmits the generated VoIP data packet to the second communication device 20. Further, the first communication device 10 receives the VoIP data packet generated in the second communication device 20 and outputs the voice signal included in the received VoIP data packet through a speaker provided at the first communication device 10.

At the time of execution of the VoIP application, real time transmission is important in transmission of VoIP data between the first communication device 10 and the second communication device 20, for smooth progression of a VoIP communication. Therefore, the operations of transmitting and receiving VoIP data packets by the first communication device 10 and the second communication device 20 needs to secure real time transmission. Therefore, it is preferred that a protocol, e.g. Real-time Transport Protocol (RTP) guaranteeing real time transmission, is applied to the operations of transmitting and receiving VoIP data packets by the first communication device 10 and the second communication device 20. For example, the first communication device 10 and the second communication device 20 may configure an RTP packet for a VoIP data packet and then transmit or receive data according to UDP. To this end, in operation 703, the first communication device 10 may further provide the second communication device 20 with a UDP port address. Further, in operation 705, the first communication device 10 may start to operate as a UDP socket to transmit or receive VoIP data packets.

In this way, when the operation of transmitting the VoIP data in operation 706 is completed, the first communication device 10 terminates the operation as the server for processing a protocol used in the VoIP application in 707.

For example, in operation 707, the first communication device 10 may transmit a message indicating termination of the communication to the second communication device 20 through the TCP connection. The message shown in FIG. 7C may be used as the message indicating termination of the communication. The message indicating termination of the communication may be configured by including an identifier, e.g. "1", indicating termination of the communication in the element type field 750 of the message, including a length value of the element in the element length field 751 of the message, and including an identifier of the device, which is a target of termination of the communication, in the element value field 752 of the message. Although the above description of the embodiment of the present disclosure is based on an example in which the first communication device 10 transmits the message indicating termination of the communication to the second communication device 20, the present disclosure is not limited to this example and it goes without saying that the second communication device 20 may transmit the message indicating termination of the communication to the first communication device 10.

Referring to FIG. 7B, the second communication device 20 connects to the first communication network 30 using a second IP address through the first communication scheme and identifies the second IP address used in the connection in operation 711. The identified second IP address may be an IP address allocated based on the first communication device 10 or an IP address allocated based on the first communication network 30.

The first communication network 30 may be a mobile communication network, such as a cellular-based communication network or a Wi-Fi network-based communication network. Especially, the first communication network 30 should be a network in which the first communication device 10 and the second communication device 20 can maintain a stable connection without an influence by the environment, and it goes without saying that the first communication network 30 may be changed in various ways in consideration of such a condition. Further, although the present embodiment is based on an example in which the second communication device 20 is directly connected to the first communication network 30 which is the same as the network connected to the first communication device 10, the present disclosure is not limited to this example. In other words, since the second communication device 20 needs only to be connected to the first communication device 10 by using the first IP address and the second IP address in order to execute the VoIP application, it goes without saying that the second communication device 20 may be indirectly connected to the first communication network 30.

Further, the first IP address may be an IP address based on IPv6. As another example, the first IP address may be an IP address based on IPv4 and, particularly, may include a public IPv4 address.

Next, in operation 712, the second communication device 20 receives data using the second communication network 40 connected to the first communication device 10. The second communication network 40 may be a network which transmits and receives data through an NFC scheme. Therefore, in order to enable the second communication device 20 to receive the predetermined data from the first communication device 10, a connection of an NFC network between the first communication device 10 and the second communication device 20 is needed in operation 712. To this end, the communication method includes operation 712 in which the first communication device 10 and the second communication device 20 maintain a predetermined distance supported by the NFC network and establish the NFC network.

Further, in operation 712, the second communication device 20 receives IP address information from the first communication device 10 through the connected NFC network.

The data received through the NFC network as described above may use a data transmission/reception message format defined in the NFC scheme and may be transmitted through, for example, the data transmission/reception message 300 as shown in FIG. 3A. Further, the data transmission/reception message 300 may include information as shown in FIG. 3B. That is, by including an identifier, which indicates that it is IP address information, in the data identifier field 301 and including a first IP address in the data field 302, the second communication device 20 can receive the first IP address information. In this event, since the IP address may include an IP address based on IPv6 or IPv4, the data identifier field 301 may include an indicator, e.g. "IPv6" or "IPv4", indicating whether the IP address included in the data field 302 corresponds to a value based on IPv6 or a value based on IPv4. Moreover, the data transmission/reception message 300 may further include a port address required for execution of a protocol used in the operation of the VoIP application. Therefore, the data transmission/reception message 300 may further include port information as well as the IP address information. Since the first communication device 10 and the second communication device 20 may use a TCP or UDP connection according to the protocol used in the operation of the VoIP application, an indicator, e.g. "TCP" or "UDP", for identifying the port may be included in the data identifier field 301 and a port address may be included in the data field 302. For example, the second communication device 20 may use a TCP connection with the first communication device 10 when the second communication device 20 needs to assure a reliable delivery of data. Also, the second communication device 20 may use a UDP connection with the first communication device 10 when the second communication device needs to transmit and receive a real-time data.

Further, the data transmission/reception message 300 may further include a communication application identifier for identifying the VoIP application. Specifically, the data identifier field 301 may include an indicator, e.g. Way, indicating that it is an identifier of a communication application, and the data field 302 may include a communication application identifier, a value of "4", indicating that it is the VoIP application.

Since the second communication device 20 has connected the NFC network with the first communication device 10 in order to receive IP address information, the second communication device 20 need not maintain the NFC network with the first communication device 10 when the reception of the IP address information from the first communication device 10 has been completed. Therefore, the method may further include, in operation 712, the second communication device 20 identifying that the reception of the IP address information from the first communication device 10 has been completed, and then disconnecting the connection of the NFC network.

Next, in operation 713, the second communication device 20 identifies the communication application type, e.g. VoIP application, by identifying the identifier of the communication application type among the information included in the IP address information.

Next, in operation 714, the first communication device 20 starts an operation of a client, corresponding to the communication application type, for transmitting and receiving data generated during the operation of the VoIP application. In this event, the first communication device 20 may set a client by using the first IP address, a port address, etc. in consideration of a protocol used in the operation of the VoIP application.

Further, in operation 715, the second communication device 20 exchanges device identifiers for performing the VoIP application with the first communication device 10. The exchange of the device identifiers may be performed based on a protocol used in the VoIP application and using the first IP address.

Since the first communication device 10 and the second communication device 20 need to secure their device identifiers in order to perform the VoIP application, the first communication device 10 and the second communication device 20 need to assure reliability between them. Therefore, it is preferred that a protocol assuring the reliability between the first communication device 10 and the second communication device 20 is applied to the operation of exchanging the device identifiers. For example, the first communication device 10 and the second communication device 20 may exchange their device identifiers by using TCP. Specifically, the second communication device 20 may receive a TCP port address from the first communication device 10 in operation 713, and then start to operate as a TCP client in operation 714.

Further, in operation 715, the second communication device 20 may transmit a connection request using the first IP address and a TCP port address to the first communication device 10. Specifically, the second communication device 20 may transmit a connection request message including an identifier of the second communication device 20 to the first communication device 10 and receive an identifier of the first communication device 10 from the first communication device 10 as a response to the request. The first device identifier may be a phone number allocated to the first communication device 10 and the second device identifier may be a phone number allocated to the second communication device 20.

Next, in operation 716, the first communication device 10 transmits and receives VoIP data, which is generated while the first communication device 10 performs the VoIP application with the second communication device 20.

For example, the second communication device 20 starts to perform a VoIP communication with the first communication device 10. First, the second communication device 20 may receive a VoIP communication start request message generated and transmitted by the first communication device 10.

For example, the message shown in FIG. 7C may be used as the communication start request message. The communication start request message may be configured by including an identifier, e.g. "0", indicating a communication start request in the element type field 750 of the message, including a length value of the element in the element length field 751 of the message, and including an identifier, e.g. an identifier of the second communication device, of the device, which is a target of the communication start request, in the element value field 752 of the message. Then, the second communication device 20 may display an identifier of the first communication device 10 or display contact information corresponding to the first communication device. Further, the second communication device 20 may simultaneously provide a UI or menu for input of a response or denial to a VoIP call when displaying the VoIP call. Further, upon receiving a response to the VoIP call from a user of the second communication device 20 through the UI or menu for input of a response or denial to the VoIP call, the second communication device 20 can start a VoIP communication with the first communication device 10.

Further, as another example, the second communication device 20 may display basic information for connection with the first communication device 10, for example, an identifier of the first communication device 10, or display contact information corresponding to the first device identifier. Further, as a user of the second communication device 20 selects the displayed first device identifier or corresponding contact information, the second communication device 20 may send a message requesting a VoIP communication to the first communication device 10 and may start the VoIP communication according to a response of the first communication device 10 to the call for the VoIP communication.

Further, the second communication device 20 generates a VoIP data packet including a voice signal input through a microphone arranged at the second communication device 20, transmits the generated VoIP data packet to the first communication device 10, receives a VoIP data packet generated in the first communication device 10, and outputs a voice signal included in the received VoIP data packet through a speaker provided at the second communication device 20.

Further, at the time of execution of the VoIP application, real time transmission is important in transmission of VoIP data between the first communication device 10 and the second communication device 20, for smooth progression of the VoIP communication. Therefore, the operations of transmitting and receiving VoIP data packets by the first communication device 10 and the second communication device 20 needs to secure real time transmission. Therefore, it is preferred that a protocol, e.g. RTP, guaranteeing real time transmission is applied to the operations of transmitting and receiving VoIP data packets by the first communication device 10 and the second communication device 20. For example, the first communication device 10 and the second communication device 20 may configure an RTP packet for a VoIP data packet and then transmit or receive data according to UDP. To this end, in operation 703, the first communication device 10 may further provide the second communication device 20 with a UDP port address. Further, the first communication device 10 and the second communication device 20 may transmit and receive the VoIP data packets through a UDP socket.

In this way, when the operation of transmitting or receiving the VoIP data operation 716 is completed, the second communication device 20 terminates the operation as the client for processing a protocol used in the VoIP application operation 717.

For example, when the VoIP communication terminates, the second communication device 20 may receive a message indicating termination of the communication from the first communication device 10 through a TCP connection and terminates the TCP connection. The message shown in FIG. 7C may be used as the message indicating termination of the communication. The message indicating termination of the communication may be configured by including an identifier, e.g. "1", indicating termination of the communication in the element type field 750 of the message, including a length value of the element in the element length field 751 of the message, and including an identifier, e.g. the identifier of the second communication device, of the device, which is a target of termination of the communication, in the element value field 752 of the message.

Further, as an alternative, the second communication device 20 may transmit a message indicating termination of the communication to the first communication device 10 through the TCP connection. Although the above description of the embodiment of the present disclosure is based on an example in which the first communication device 10 transmits the message indicating termination of the communication to the second communication device 20, the present disclosure is not limited to this example and it goes without saying that the second communication device 20 may transmit the message indicating termination of the communication to the first communication device 10.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of performing communication with a second communication device by a first communication device, the method comprising:
   identifying a first internet protocol (IP) address for communication via a first communication network;
   executing a communication application capable of connecting the first communication device with a second communication device via the first communication network using the first IP address;
   providing data including the first IP address to the second communication device through a second communication network which is different from the first communication network;
   setting a connection between the first communication device and the second communication device via the first communication network using the first IP address, wherein the second communication device sets the connection between the first communication device and the second communication device based on the received first IP address; and
   transmitting data related to the communication application to the second communication device via the connection.

2. The method of claim 1, wherein the second communication network comprises a near field communication (NFC) network.

3. The method of claim 1, wherein the data including first the IP address comprises an identifier that identifies the communication application.

4. The method of claim 1, wherein the setting of the connection comprises starting an operation of a server using the connection.

5. The method of claim 1, wherein the communication application comprises a data file transmission application for transmitting or receiving a data file.

6. The method of claim 5, wherein the data including the first IP address comprises an identifier of the data file to be transmitted and a storage position of the data file.

7. The method of claim 1, wherein the communication application comprises an instant message (IM) application for transmitting or receiving IM data.

8. The method of claim 7, wherein the transmitting the data related to the communication application comprises:
   providing an identifier of the first communication device to the second communication device;
   receiving an identifier of the second communication device; and
   transmitting and receiving the IM data by using the identifier of the first communication device and the identifier of the second communication device.

9. The method of claim 1, wherein the communication application comprises an image file transmission application for transmitting or receiving an image data file.

10. The method of claim 9, wherein the transmitting of the data related to the communication application comprises:
    acquiring an image data file; and
    transmitting the acquired image data file to the second communication device.

11. The method of claim 10, wherein the transmitting of the image data file to the second communication device comprises:
    providing the second communication device with image information including an image identifier that identifies the image file; and
    transmitting the image file according to a request from the second communication device, to the second communication device.

12. The method of claim 1, wherein the communication application comprises a voice over internet protocol (VoIP) application for transmitting or receiving VoIP data.

13. The method of claim 12, wherein the transmitting of the data related to the communication application comprises:
    providing a first communication device identifier, which identifies the first communication device, to the second communication device;
    receiving a second communication device identifier, which identifies the second communication device, from the second communication device; and
    transmitting and receiving the VoIP data by using the first communication device identifier and the second communication device identifier.

14. A terminal apparatus comprising:
    a first communication unit;
    a second communication unit;
    a memory configured to store at least a communication processing program; and
    at least one processor configured to control at least the communication processing program, the communication processing program comprising commands for:
       identifying a first internet protocol (IP) address, for communication via a first communication network, using the first communication unit,
       executing a communication application capable of connecting a first device with a second communication device via the first communication network using the first IP address,
       providing data, including the first IP address, to a second communication device through a second communication network which is different from the first communication network, using the second communication unit,
       setting a connection between the first communication device and the second communication device via the first communication network using the first IP address, wherein the second communication device sets the connection between the first communication device and the second communication device based on the received first IP address, and
       transmitting data related to the communication application to the second communication device via the connection.

15. A method of performing communication by a second communication device connected with a first communication device, the method comprising:
    identifying a second internet protocol (IP) address of a second communication device for communication via a first communication network;
    receiving data, including first IP address of the first communication device, from the first communication device through a second communication network which is different from the first communication network, in response to a request for the first communication device;
    setting a connection between the first communication device and the second communication device via the first communication network using the first IP address and the second IP address; and
    receiving data related to a communication application executed in the first communication device, from the first communication device via the connection.

16. The method of claim 15, wherein the second communication network comprises a near field communication (NFC) network.

17. The method of claim 15, wherein the data including the first IP address comprises an identifier that identifies the communication application.

18. The method of claim 15, wherein receiving data related to the communication application comprises starting an operation of a client using the connection.

19. The method of claim 15, wherein the communication application comprises an image file transmission application that transmits and receives an image data file, and
    wherein the receiving data related to the communication application comprises:
       receiving image information including an identifier of an image file acquired by the first communication device;
       requesting transmission of the acquired image file by using the image information; and
       receiving the image data file from the first communication device.

20. A second communication device communicating with a first communication device, the second communication device comprising:
    a first communication unit;
    a second communication unit;
    a memory configured to store at least a communication processing program; and
    at least one processor configured to control at least the communication processing program, the communication processing program comprising commands for:
       identifying a second internet protocol (IP) address of the second communication device, for communication via a first communication network, using the first communication unit,
       receiving data, including a first IP address of the first communication device, from the first communication device through a second communication network which is different from the first communication network, in response to a request for the first communication device, using the second communication unit,
       setting a connection between the first communication device and the second communication device via the first communication network using the first IP address and the second IP address, and receiving data related to a communication application executed in the first communication device, from the first communication device via the connection.

21. The method of claim 1, wherein the providing the data includes if providing the data is complete, releasing the second communication network with the second communication device.

22. The apparatus of claim 14, wherein the providing the data includes if providing the data is complete, releasing the second communication network with the second communication device.

23. The method of claim 15, wherein if the receiving the data including the first IP address is complete, the second communication network is released.

24. The device of claim 20, wherein if the receiving the data including the first IP address is complete, the second communication network is released.

* * * * *